US011597368B2

(12) United States Patent
Seol et al.

(10) Patent No.: US 11,597,368 B2
(45) Date of Patent: Mar. 7, 2023

(54) APPARATUS AND METHOD FOR CONTROLLING ESC-INTEGRATED REGENERATIVE BRAKING SYSTEM

(71) Applicant: HYUNDAI MOBIS CO., LTD., Seoul (KR)

(72) Inventors: Yong Cheol Seol, Yongin-si (KR); Jee Sang Lee, Yongin-si (KR); Wan Kyo Jung, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 266 days.

(21) Appl. No.: 16/860,664

(22) Filed: Apr. 28, 2020

(65) Prior Publication Data
US 2021/0053544 A1 Feb. 25, 2021

(30) Foreign Application Priority Data
Aug. 19, 2019 (KR) .................. 10-2019-0100962

(51) Int. Cl.
*B60T 13/68* (2006.01)
*B60T 17/22* (2006.01)
*B60T 13/74* (2006.01)

(52) U.S. Cl.
CPC .......... *B60T 17/221* (2013.01); *B60T 13/745* (2013.01); *B60T 2270/60* (2013.01)

(58) Field of Classification Search
CPC .... B60T 13/686; B60T 13/662; B60T 13/745; B60T 17/06; B60T 17/221;
(Continued)

(56) References Cited

U.S. PATENT DOCUMENTS

| 2003/0006891 A1* | 1/2003 | Wild | B60T 17/02 340/451 |
| 2007/0176486 A1* | 8/2007 | Nakamura | B60K 6/365 303/DIG. 2 |

(Continued)

FOREIGN PATENT DOCUMENTS

| CN | 111076095 A | * 4/2020 |
| KR | 10-2016-0028043 | 3/2016 |
| KR | 10-2019-0037599 | 4/2019 |

*Primary Examiner* — Robert A. Siconolfi
*Assistant Examiner* — Stephen M Bowes
(74) *Attorney, Agent, or Firm* — H.C. Park & Associates, PLC

(57) ABSTRACT

An apparatus for controlling an ESC-integrated regenerative braking system that includes a pedal cylinder unit connected to a reservoir unit to generate a hydraulic pressure by pressing a brake pedal, a motor driven by an electrical signal output in response to a displacement of the brake pedal, a master cylinder unit connected to the pedal cylinder unit to form a hydraulic pressure for braking through a master piston moving by the driving of the motor, a control unit configured to detect a leakage of oil, based on a change in pressure in a hydraulic passage, during single-stage control, two-stage control, single-stage single-acting control, or two-stage single-acting control of the master cylinder unit, and a hydraulic control valve provided in a hydraulic passage for connecting the reservoir unit to a wheel cylinder to brake each wheel, to be opened and closed under control of the control unit.

20 Claims, 14 Drawing Sheets

(58) Field of Classification Search
CPC ............. B60T 2270/40; B60T 2270/60; B60T 2270/403; B60T 2270/406
See application file for complete search history.

(56) References Cited

U.S. PATENT DOCUMENTS

| | | | |
|---|---|---|---|
| 2012/0212044 A1* | 8/2012 | Nakamura | B60L 7/18 |
| | | | 303/9.62 |
| 2012/0235469 A1* | 9/2012 | Miyazaki | B60T 8/94 |
| | | | 303/6.01 |
| 2019/0100180 A1 | 4/2019 | Park | |
| 2019/0100183 A1* | 4/2019 | Jung | B60T 13/686 |
| 2019/0100189 A1* | 4/2019 | Ganzel | B60T 7/042 |

* cited by examiner

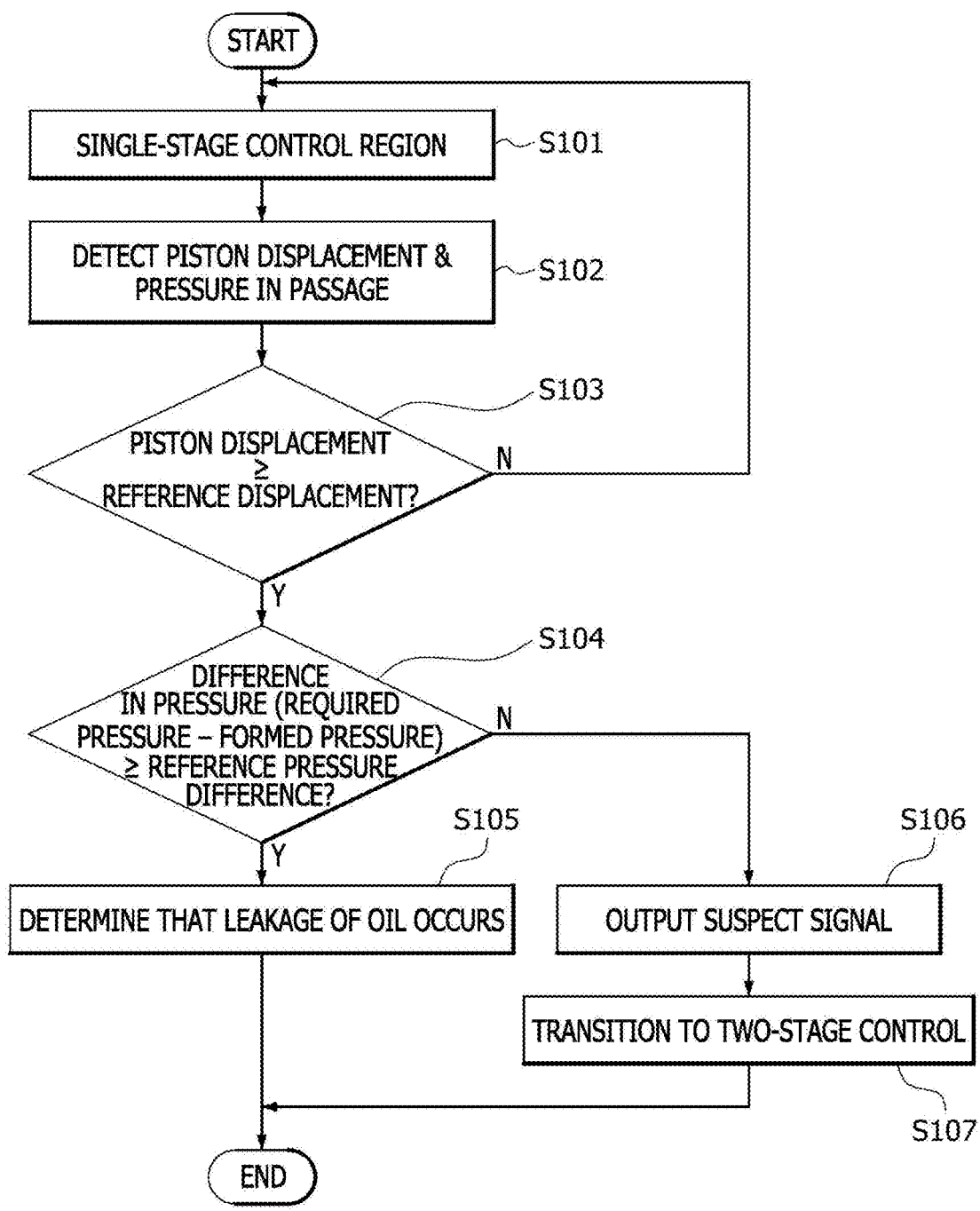

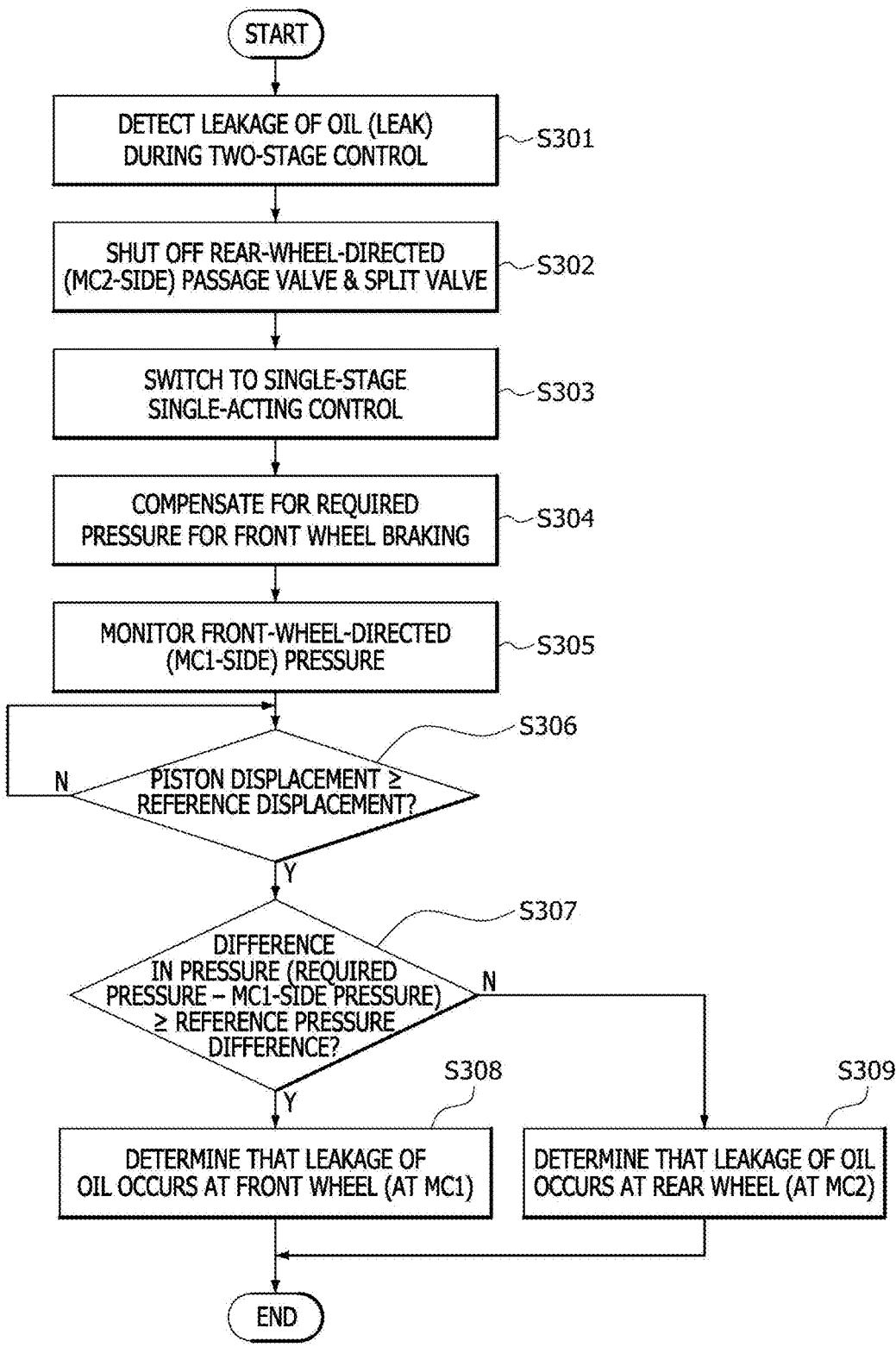

APPARATUS AND METHOD FOR CONTROLLING ESC-INTEGRATED REGENERATIVE BRAKING SYSTEM

CROSS-REFERENCE TO RELATED APPLICATION

This application claims priority from and the benefit of Korean Patent Application No. 10-2019-0100962, filed on Aug. 19, 2019, which application is hereby incorporated by reference for herein for all purposes as if set forth herein by this reference.

BACKGROUND

Field

Exemplary embodiments relate to an apparatus and method for controlling an ESC-integrated regenerative braking system, and more particularly, to an apparatus and method for controlling an ESC-integrated regenerative braking system that can stably detect a leakage of oil even during braking and ensure a braking force by reflecting a driver's intention of braking even while oil is leaking in an ESC-integrated braking system.

Discussion of the Background

In general, examples of a brake system include an anti-lock brake system (ABS) that prevents wheels from slipping during braking, a brake traction control system (BTCS) that prevents drive wheels from slipping during sudden or rapid acceleration of a vehicle, and an electronic stability control system (ESC) that keeps vehicle traveling stable by controlling brake hydraulic pressure with a combination of anti-lock braking and traction control.

Such an electronic brake system includes a hydraulic supply device that supplies pressure to wheel cylinders by receiving a driver's intention of braking as an electrical signal from a pedal displacement sensor for detecting the displacement of a brake pedal when a driver presses the brake pedal. If a leak occurs in a passage due to the leakage of oil, normal braking is impossible. Therefore, there is a need for a method capable of accurately detecting a leakage of oil even during braking and ensuring a maximum possible braking force by reflecting a driver's intention of braking even while oil is leaking in the electronic brake system.

The above information disclosed in this Background section is only for enhancement of understanding of the background of the invention and, therefore, it may contain information that does not constitute prior art.

SUMMARY

Exemplary embodiments of the present invention are directed to an apparatus and method for controlling an ESC-integrated regenerative braking system that can stably detect a leakage of oil even during braking and ensure a braking force by reflecting a driver's intention of braking even while oil is leaking in an ESC-integrated braking system.

In an embodiment, there is provided an apparatus for controlling an ESC-integrated regenerative braking system that includes a pedal cylinder unit connected to a reservoir unit storing oil therein, the pedal cylinder unit generating a hydraulic pressure by pressing a brake pedal, a motor driven by an electrical signal output in response to a displacement of the brake pedal, a master cylinder unit connected to the pedal cylinder unit to form a hydraulic pressure for braking through a master piston moving forward and backward by the driving of the motor, a control unit configured to detect a leakage of oil while a vehicle is traveling or stops, based on a change in pressure in a hydraulic passage, during single-stage control, two-stage control, single-stage single-acting control, or two-stage single-acting control of the master cylinder unit, and a hydraulic control valve provided in a hydraulic passage for connecting the reservoir unit to a wheel cylinder configured to brake each wheel, the hydraulic control valve being opened and closed under control of the control unit.

The hydraulic control valve may include a first hydraulic control valve configured to regulate a hydraulic pressure in a hydraulic passage for connecting the reservoir unit to a first chamber of the pedal cylinder unit, a second hydraulic control valve configured to regulate a hydraulic pressure in a hydraulic passage for connecting the first chamber of the pedal cylinder unit to a fourth chamber of the master cylinder unit, a third hydraulic control valve configured to regulate a hydraulic pressure in a hydraulic passage for connecting a second chamber of the pedal cylinder unit to a third chamber of the master cylinder unit, a fourth hydraulic control valve configured to regulate a hydraulic pressure in a hydraulic passage for connecting the third chamber of the master cylinder unit to the wheel cylinder, a fifth hydraulic control valve configured to regulate a hydraulic pressure in a hydraulic passage for connecting the fourth chamber of the master cylinder unit to the wheel cylinder, and a sixth hydraulic control valve configured to regulate a hydraulic pressure in a hydraulic passage for connecting the fourth hydraulic control valve to the fifth hydraulic control valve.

The single-stage control may refer to controlling the braking to be performed by pushing the master piston of the master cylinder unit toward a third chamber to pressurize oil. The two-stage control may refer to controlling the braking to be performed by pulling the master piston of the master cylinder unit toward a fourth chamber to pressurize oil. The single-stage single-acting control may refer to controlling the braking to be performed only by a front-wheel-side wheel cylinder through the single-stage control. The two-stage single-acting control may refer to controlling the braking to be performed only by a rear-wheel-side wheel cylinder through the two-stage control.

The control unit may monitor a displacement of the master piston and a pressure in the hydraulic passage using a pressure sensor during the single-stage control of the master cylinder unit. When the displacement of the master piston is a specified leakage determination reference displacement, if a difference in pressure (required pressure−formed pressure) is equal to or more than a specified reference pressure difference, the control unit may determine that the leakage of oil occurs. If the difference in pressure (required pressure−formed pressure) is less than the specified reference pressure difference, the control unit may output a suspect signal indicating that there is a possibility of leakage and perform a transition to the two-stage control.

The control unit may accumulate the number of outputs of the suspect signal. When the cumulative number of suspect signals is equal to or more than a predetermined reference number, the control unit may determine that the leakage of oil occurs.

When the single-stage control transitions to the two-stage control, the control unit may monitor a displacement of the master piston and a pressure in the hydraulic passage. When the displacement of the master piston is a specified leakage determination reference displacement, if a difference in pressure (required pressure–formed pressure) is equal to or more than a specified reference pressure difference and the formed pressure is smaller than a specified leakage determination reference pressure, the control unit may determine that the leakage of oil occurs. After the transition to the two-stage control, if the difference in pressure (required pressure–formed pressure) is less than the specified reference pressure difference and the formed pressure is equal to or greater than the specified leakage determination reference pressure, the control unit may determine that an internal leakage occurs due to foreign substances trapped in the hydraulic control valve or a seal cup and the hydraulic control valve or seal cup is in a normal state due to removal of the foreign substances therefrom.

When the leakage of oil is detected during the two-stage control, the control unit may shut off a fifth hydraulic control valve for regulating a hydraulic pressure in a rear-wheel-side hydraulic passage and a sixth hydraulic control valve as a split shut-off valve and switch to the single-stage single-acting control for a front wheel. During the single-stage single-acting control, when a displacement of the master piston reaches a leakage determination reference displacement, if a front-wheel-side formed pressure is smaller than a specified leakage determination reference pressure (reference pressure when controlling front-wheel-side wheel cylinder, which is pressure at the time of transition+pressure corresponding to piston displacement) and a difference in pressure (required pressure for front-wheel-side wheel cylinder control–pressure in front-wheel-side hydraulic passage) is equal to or more than a predetermined reference pressure difference, the control unit may determine that the leakage of oil occurs in the front-wheel-side hydraulic passage.

When the displacement of the master piston reaches the leakage determination reference displacement, if the front-wheel-side formed pressure is equal to or greater than the specified leakage determination reference pressure (reference pressure when controlling front-wheel-side wheel cylinder, which is pressure at the time of transition+pressure corresponding to piston displacement) and the difference in pressure (required pressure for front-wheel-side wheel cylinder control–pressure in front-wheel-side hydraulic passage) is smaller than the predetermined reference pressure difference, the control unit may determine that the leakage of oil occurs in the rear-wheel-side hydraulic passage.

The control unit may brake only the front wheel during the single-stage single-acting control, and compensate for the required pressure to generate a required pressure higher than the reference pressure, based on a predetermined equation, in order to realize a deceleration as in a normal state in which front and rear wheels are controllable together when there is no leakage.

The required pressure higher than the reference pressure may be generated based on 4-wheel braking force/front wheel braking force*required pressure in normal state.

When the leakage of oil is detected during the single-stage control, the control unit may shut off a second hydraulic control valve for regulating a hydraulic pressure in a front-wheel-side hydraulic passage and a sixth hydraulic control valve as a split shut-off valve and switches to the two-stage single-acting control for a rear wheel. During the two-stage single-acting control, when a displacement of the master piston reaches a leakage determination reference displacement, if a rear-wheel-side formed pressure is smaller than a specified leakage determination reference pressure (reference pressure when controlling rear-wheel-side wheel cylinder, which is pressure at the time of transition+pressure corresponding to piston displacement) and a difference in pressure (required pressure for rear-wheel-side wheel cylinder control–pressure in rear-wheel-side hydraulic passage) is equal to or more than a predetermined reference pressure difference, the control unit may determine that the leakage of oil occurs in the rear-wheel-side hydraulic passage.

When the displacement of the master piston reaches the leakage determination reference displacement, if the rear-wheel-side formed pressure is equal to or greater than the specified leakage determination reference pressure (reference pressure when controlling rear-wheel-side wheel cylinder, which is pressure at the time of transition+pressure corresponding to piston displacement) and the difference in pressure (required pressure for rear-wheel-side wheel cylinder control–pressure in rear-wheel-side hydraulic passage) is less than the predetermined reference pressure difference, the control unit may determine that the leakage of oil occurs in the front-wheel-side hydraulic passage.

The control unit may brake only the rear wheel during the two-stage single-acting control, and compensate for the required pressure to generate a required pressure higher than the reference pressure, based on a predetermined equation, in order to realize a deceleration as in a normal state in which front and rear wheels are controllable together when there is no leakage.

The required pressure higher than the reference pressure may be generated based on 4-wheel braking force/rear wheel braking force*required pressure in normal state.

When the leakage of oil is detected during the single-stage control without a pressure sensor for detecting a pressure of a rear-wheel-side hydraulic passage, the control unit may shut off a second hydraulic control valve for regulating a hydraulic pressure in a front-wheel-side hydraulic passage and a sixth hydraulic control valve as a split shut-off valve and switch to the two-stage single-acting control for a rear wheel. For the two-stage single-acting control for the rear wheel, the control unit may control a motor of the master cylinder unit to make a piston displacement corresponding to a predetermined required pressure and continue to monitor a current of the motor. After a displacement of the master piston reaches a specified displacement, if a difference in motor current (expected current corresponding to piston displacement–measured motor current) is more than a predetermined reference current difference, the control unit may determine that the leakage of oil occurs in the rear-wheel-side hydraulic passage.

After the displacement of the master piston reaches the specified displacement, if the difference in motor current (expected current corresponding to piston displacement–measured motor current) is less than or equal to the predetermined reference current difference, the control unit may determine that the leakage of oil occurs in the front-wheel-side hydraulic passage.

In an embodiment, there is provided a method of controlling an ESC-integrated regenerative braking system, for detecting a leakage of oil while a vehicle is traveling or stops, based on a change in pressure in a hydraulic passage, during single-stage control, two-stage control, single-stage single-acting control, or two-stage single-acting control of a master cylinder unit of an ESC-integrated regenerative braking system. The method includes a control unit monitoring a displacement of a master piston and a pressure in the hydraulic passage using a pressure sensor during the single-stage control of the master cylinder unit, when the displacement of the master piston is a specified leakage determination reference displacement, the control unit determining that the leakage of oil occurs if a difference in pressure (required pressure−formed pressure) is equal to or more than a specified reference pressure difference, and the control unit outputting a suspect signal indicating that there is a possibility of leakage and performing a transition to the two-stage control if the difference in pressure (required pressure−formed pressure) is less than the specified reference pressure difference.

The method may further include the control unit accumulating the number of outputs of the suspect signal and determining that the leakage of oil occurs when the cumulative number of suspect signals is equal to or more than a predetermined reference number.

The method may further include, when the single-stage control transitions to the two-stage control, the control unit monitoring the displacement of the master piston and the pressure in the hydraulic passage, and when the displacement of the master piston is the specified leakage determination reference displacement, determining that the leakage of oil occurs if the difference in pressure (required pressure−formed pressure) is equal to or more than the specified reference pressure difference and the formed pressure is smaller than a specified leakage determination reference pressure, and after the transition to the two-stage control, the control unit determining that an internal leakage occurs due to foreign substances trapped in a hydraulic control valve or a seal cup and the hydraulic control valve or seal cup is in a normal state due to removal of the foreign substances therefrom if the difference in pressure (required pressure−formed pressure) is less than the specified reference pressure difference and the formed pressure is equal to or greater than the specified leakage determination reference pressure.

The method may further include, when the leakage of oil is detected during the two-stage control, the control unit shutting off a fifth hydraulic control valve for regulating a hydraulic pressure in a rear-wheel-side hydraulic passage and a sixth hydraulic control valve as a split shut-off valve and switching to the single-stage single-acting control for a front wheel, and during the single-stage single-acting control, when the displacement of the master piston reaches the leakage determination reference displacement, the control unit determining that the leakage of oil occurs in a front-wheel-side hydraulic passage if a front-wheel-side formed pressure is smaller than a specified leakage determination reference pressure (reference pressure when controlling front-wheel-side wheel cylinder, which is pressure at the time of transition+pressure corresponding to piston displacement) and a difference in pressure (required pressure for front-wheel-side wheel cylinder control−pressure in front-wheel-side hydraulic passage) is equal to or more than a predetermined reference pressure difference.

The method may further include, when the displacement of the master piston reaches the leakage determination reference displacement, the control unit determining that the leakage of oil occurs in the rear-wheel-side hydraulic passage if the front-wheel-side formed pressure is equal to or greater than the specified leakage determination reference pressure (reference pressure when controlling front-wheel-side wheel cylinder, which is pressure at the time of transition+pressure corresponding to piston displacement) and the difference in pressure (required pressure for front-wheel-side wheel cylinder control−pressure in front-wheel-side hydraulic passage) is less than the predetermined reference pressure difference.

In order to realize a deceleration as in a normal state in which front and rear wheels are controllable together when there is no leakage by braking only the front wheel during the single-stage single-acting control, the control unit may compensate for the required pressure to generate a required pressure higher than the reference pressure, based on a predetermined equation, and the required pressure higher than the reference pressure may be generated based on 4-wheel braking force/front wheel braking force*required pressure in normal state.

The method may further include, when the leakage of oil is detected during the single-stage control, the control unit shutting off a second hydraulic control valve for regulating a hydraulic pressure in a front-wheel-side hydraulic passage and a sixth hydraulic control valve as a split shut-off valve and switching to the two-stage single-acting control for a rear wheel, and during the two-stage single-acting control, when the displacement of the master piston reaches the leakage determination reference displacement, the control unit determining that the leakage of oil occurs in a rear-wheel-side hydraulic passage if a rear-wheel-side formed pressure is smaller than a specified leakage determination reference pressure (reference pressure when controlling rear-wheel-side wheel cylinder, which is pressure at the time of transition+pressure corresponding to piston displacement) and a difference in pressure (required pressure for rear-wheel-side wheel cylinder control−pressure in rear-wheel-side hydraulic passage) is equal to or more than a predetermined reference pressure difference.

The method may further include, when the displacement of the master piston reaches the leakage determination reference displacement, the control unit determining that the leakage of oil occurs in the front-wheel-side hydraulic passage if the rear-wheel-side formed pressure is equal to or greater than the specified leakage determination reference pressure (reference pressure when controlling rear-wheel-side wheel cylinder, which is pressure at the time of transition+pressure corresponding to piston displacement) and the difference in pressure (required pressure for rear-wheel-side wheel cylinder control−pressure in rear-wheel-side hydraulic passage) is less than the predetermined reference pressure difference.

In order to realize a deceleration as in a normal state in which front and rear wheels are controllable together when there is no leakage by braking only the rear wheel during the two-stage single-acting control, the control unit may compensate for the required pressure to generate a required pressure higher than the reference pressure, based on a predetermined equation, and the required pressure higher than the reference pressure may be generated based on 4-wheel braking force/rear wheel braking force*required pressure in normal state.

The method may further include, when the leakage of oil is detected during the single-stage control without a pressure sensor for detecting a pressure of a rear-wheel-side hydraulic passage, the control unit shutting off a second hydraulic control valve for regulating a hydraulic pressure in a front-wheel-side hydraulic passage and a sixth hydraulic control valve as a split shut-off valve and switching to the two-stage single-acting control for a rear wheel, for the two-stage single-acting control for the rear wheel, the control unit controlling a motor of the master cylinder unit to make a piston displacement corresponding to a predetermined required pressure and continuing to monitor a current of the motor, and when the displacement of the master piston reaches a specified displacement, the control unit determining that the leakage of oil occurs in the rear-wheel-side hydraulic passage if a difference in motor current (expected current corresponding to piston displacement–measured motor current) is more than a predetermined reference current difference.

The method may further include, when the displacement of the master piston reaches the specified displacement, the control unit determining that the leakage of oil occurs in the front-wheel-side hydraulic passage if the difference in motor current (expected current corresponding to piston displacement–measured motor current) is less than or equal to the predetermined reference current difference.

As apparent from the above description, in accordance with the embodiments of the present disclosure, it is possible to stably detect a leakage of oil even during braking and ensure a braking force by reflecting a driver's intention of braking even while oil is leaking in the ESC-integrated braking system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 3 is a flowchart for explaining the method of detecting a leakage of oil during the single-stage control in FIGS. 2A, 2B, and 2C.

FIG. 9 is a flowchart for explaining the operation when the single-stage single-acting control is performed in directions equal to and different from the wheel direction in which the leakage of oil occurs in FIGS. 7A, 7B, 8A, and 8B.

DETAILED DESCRIPTION OF THE ILLUSTRATED EMBODIMENTS

Figure 1:
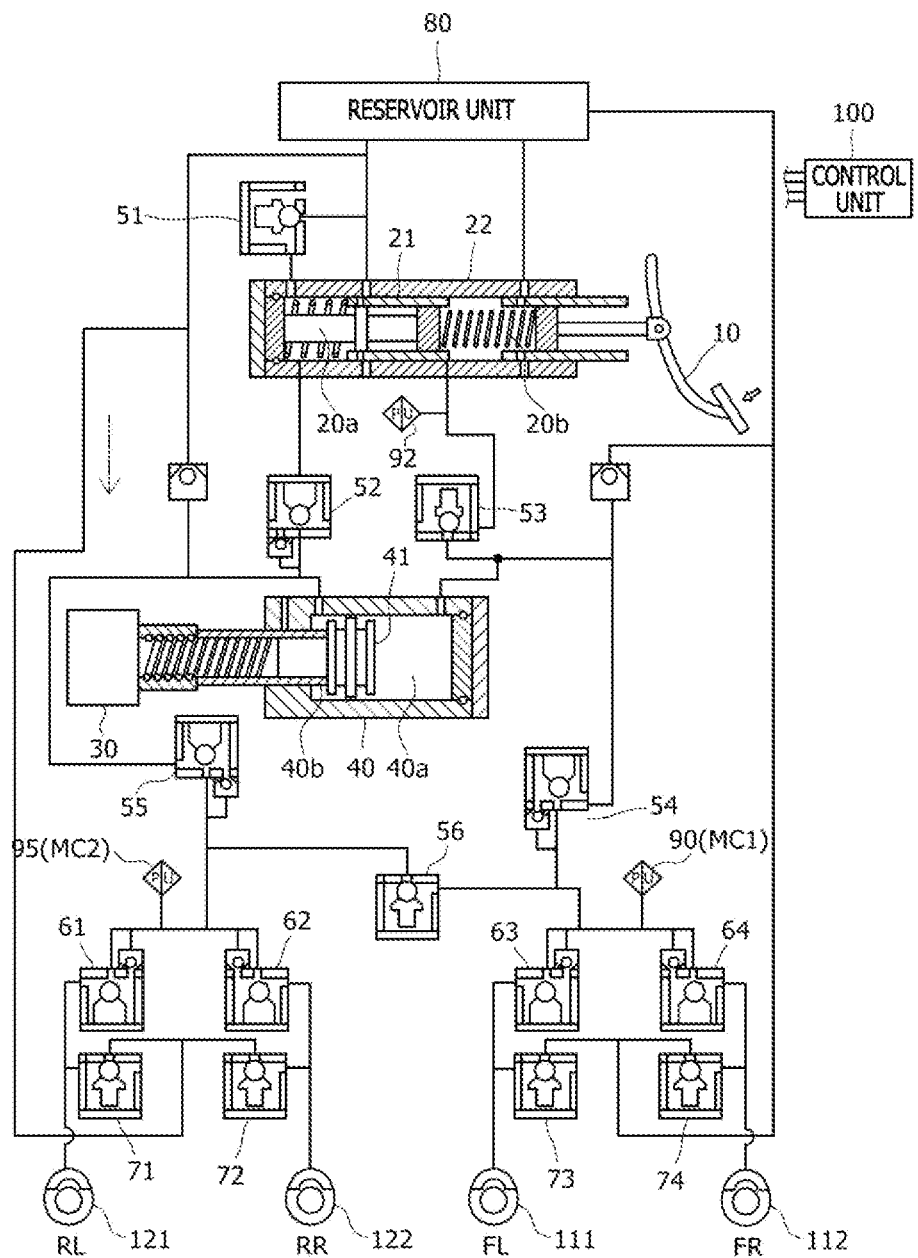
FIG. 1 is an exemplary diagram schematically illustrating an apparatus for controlling an ESC-integrated regenerative braking system according to an embodiment of the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and method for controlling an ESC-integrated regenerative braking system will be described with reference to the accompanying drawings through various examples of embodiments.

It should be noted that the drawings are not necessarily to scale and may be exaggerated in thickness of lines or sizes of components for clarity and convenience of description. Furthermore, the terms as used herein are terms defined in consideration of functions of the disclosure and may change depending on the intention or practice of a user or an operator. Therefore, these terms should be defined based on the overall disclosures set forth herein.

FIG. 1 is an exemplary diagram schematically illustrating an apparatus for controlling an ESC-integrated regenerative braking system according to an embodiment of the present disclosure.

As illustrated in FIG. 1, the apparatus for controlling an ESC-integrated regenerative braking system according to the embodiment includes a reservoir unit 80, a pedal cylinder unit 20, a motor 30, a master cylinder unit 40, wheel cylinders 111, 112, 121, and 122, hydraulic control valves 51, 52, 53, 54, 55, and 56, and a control unit 100.

The reservoir unit 80 is coupled to the upper portion of the pedal cylinder unit 20 to store oil.

In this case, the reservoir unit 80 may include a reservoir liquid level sensor (not illustrated).

The pedal cylinder unit 20 generates a hydraulic pressure by pressing a brake pedal 10.

The pedal cylinder unit 20 includes a pedal cylinder 22 and a pedal simulator 21, and may define two chambers 20a and 20b. For example, the pedal cylinder unit 20 may include a first chamber 20a and a second chamber 20b.

For example, when a driver's pedal effort is applied to the brake pedal 10, the pedal cylinder 22 generates a hydraulic pressure and the generated hydraulic pressure is supplied to the piston of the pedal simulator 21 to press the elastic body of the pedal simulator 21, so that a driver's pedal feel is realized by the reaction force of the pressed elastic body.

The motor 30 is operated by an electrical signal output in response to the displacement of the brake pedal 10.

The control unit 100 may control the driving of the motor 30 by receiving a signal indicative of detection of rotation of the brake pedal 10.

The master cylinder unit 40 is driven by the motor 30 controlled by the control unit 100 and generates a hydraulic pressure to supply the hydraulic pressure to the wheel cylinders 111, 112, 121, and 122 for braking respective wheels RR, RL, FR, and FL.

Here, the control unit 100 may be an electronic control unit (ECU) which is a representative control unit of a vehicle.

For example, when a driver presses the brake pedal 10, a pedal stroke sensor (not illustrated) detects the stroke of the brake pedal 10 to transmit the detected stroke to the control unit 100 so that the control unit 100 controls the motor 30 based on the stroke (or displacement) of the brake pedal 10 detected by the pedal stroke sensor to control the hydraulic pressure generated by the master cylinder unit 40.

In this case, the motor 30 operates under the control of the control unit 100 to form a hydraulic pressure for braking, based on the signals respectively output from the pedal stroke sensor (not illustrated) and a pedal cylinder pressure sensor 92, as the brake pedal 10 is pressed.

The master cylinder unit 40 may include a master piston 41 and may define two chambers 40a and 40b. For example, the master cylinder unit 40 may include a third chamber 40a and a fourth chamber 40b.

The wheel cylinders 111, 112, 121, and 122 include a first wheel cylinder 111 for braking a front left wheel FL of the vehicle, a second wheel cylinder 112 for braking a front right wheel FR of the vehicle, a third wheel cylinder 121 for braking a rear left wheel RL of the vehicle, and a fourth wheel cylinder 122 for braking a rear right wheel RR of the vehicle.

In a hydraulic passage between the wheel cylinders 111, 112, 121, and 122 and the reservoir unit 80, inlet valves 61 to 64 are provided to control brake oil supplied to the individual wheel cylinders 111, 112, 121, and 122, and outlet valves 71, 72, 73, and 74 are provided to control brake oil discharged from the individual wheel cylinders 111, 112, 121, and 122.

The hydraulic control valves 51, 52, 53, 54, 55, and 56 are provided in the hydraulic passage and are opened and closed under the control of the control unit 100. The hydraulic control valve 51, 52, 53, 54, 55, and 56 may consist of first to sixth hydraulic control valves.

The first hydraulic control valve 51 is provided in a hydraulic passage connecting the reservoir unit 80 to the first chamber 20a of the pedal cylinder unit 20, and is opened and closed to regulate a hydraulic pressure under the control of the control unit 100.

The second hydraulic control valve 52 is provided in a hydraulic passage connecting the first chamber 20a of the pedal cylinder unit 20 to the fourth chamber 40b of the master cylinder unit 40, and is opened and closed to regulate a hydraulic pressure under the control of the control unit 100.

The third hydraulic control valve 53 is provided in a hydraulic passage connecting the second chamber 20b of the pedal cylinder unit 20 to the third chamber 40a of the master cylinder unit 40, and is opened and closed to regulate a hydraulic pressure under the control of the control unit 100.

The fourth hydraulic control valve 54 is provided in a hydraulic passage connecting the third chamber 40a of the master cylinder unit 40 to the wheel cylinders, and is opened and closed to regulate a hydraulic pressure under the control of the control unit 100.

The fifth hydraulic control valve 55 is provided in a hydraulic passage connecting the fourth chamber 40b of the master cylinder unit 40 to the wheel cylinders, and is opened and closed to regulate a hydraulic pressure under the control of the control unit 100.

The sixth hydraulic control valve 56 (or split shut-off valve) is in a hydraulic passage connecting the fourth hydraulic control valve 54 to the wheel cylinders 121 and 122 and in a hydraulic passage connecting the fifth hydraulic control valve 55 to the wheel cylinder 111 and 112, and is opened and closed to regulate a hydraulic pressure under the control of the control unit 100.

Here, the hydraulic passage connecting the fourth hydraulic control valve 54 to the wheel cylinders 121 and 122 is connected to the fourth chamber 40b of the master cylinder unit 40 to guide a hydraulic pressure to the third and fourth wheel cylinders 121 and 122 mounted to the respective two rear wheels RL and RR. The hydraulic passage connecting the fourth hydraulic control valve 54 to the wheel cylinders 121 and 122 may be provided with a second pressure sensor 95 for hydraulic pressure measurement. In this case, the second pressure sensor 95 may be deleted for cost reduction.

The hydraulic passage connecting the fifth hydraulic control valve 55 to the wheel cylinders 111 and 112 is connected to the third chamber 40a of the master cylinder unit 40 to guide a hydraulic pressure to the first and second wheel cylinders 111 and 112 mounted to the respective two front wheels FL and FR. The hydraulic passage connecting the fifth hydraulic control valve 55 to the wheel cylinders 111 and 112 may be provided with a first pressure sensor 90 for hydraulic pressure measurement.

The first to sixth hydraulic control valves 51, 52, 53, 54, 55, and 56 may be normally actuated valves as solenoid valves controlled by the control unit 100.

The sixth hydraulic control valve 56 (or split shut-off valve) is a line split valve that may set a string force capable of maintaining a predetermined pressure or more in an off state.

In connection with the schematic structure of the ESC-integrated regenerative braking system configured as described above, when the driver's pedal effort is applied to the brake pedal 10, the pedal cylinder 22 generates a hydraulic pressure and the generated hydraulic pressure is supplied to the piston of the pedal simulator 21 to press the elastic body of the pedal simulator 21, so that the driver's pedal feel is realized by the reaction force of the pressed elastic body. In this case, the motor 30 operates under the control of the control unit 100 to form a hydraulic pressure for braking, based on the signals respectively output from the pedal stroke sensor (not illustrated) and the pedal cylinder pressure sensor 92, as the brake pedal 10 is pressed. The master cylinder unit 40 forms the hydraulic pressure for braking through the master piston 41 moved forward and backward by the motor 30.

Hereinafter, a method of detecting a leakage of oil during braking using the ESC-integrated regenerative braking system will be described.

Figure 2A:
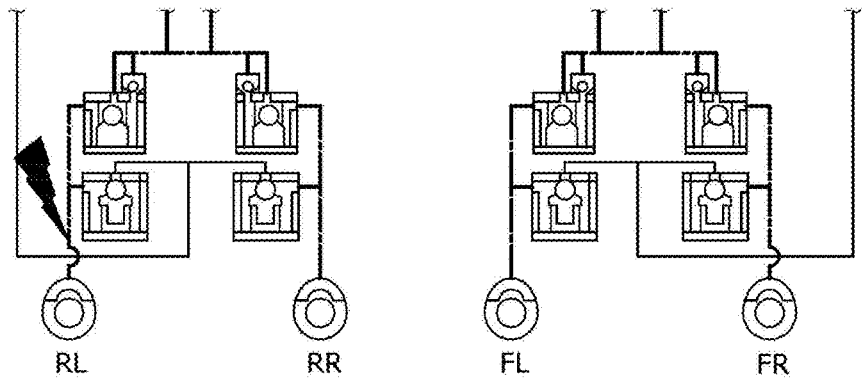
FIGS. 2A, 2B, and 2C are exemplary views for explaining a method of detecting a leakage of oil during single-stage control of a master cylinder unit in FIG. 1.
Figure 2B:
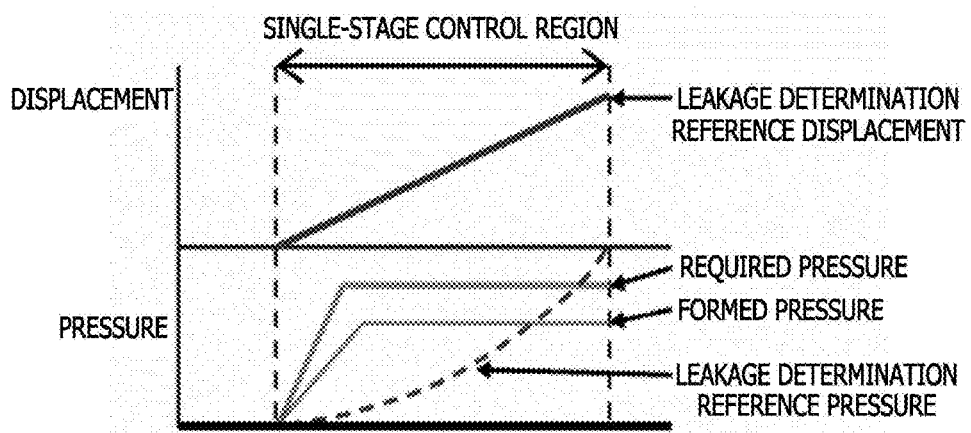
Figure 2C:
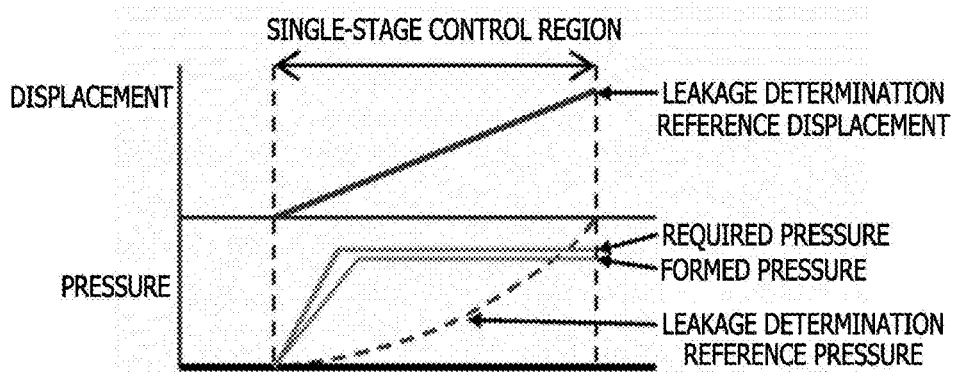

FIGS. 2A, 2B, and 2C are exemplary views for explaining the method of detecting a leakage of oil (leak) during the single-stage control of the master cylinder unit 40 in FIG. 1.

Here, the single-stage control refers to controlling the braking to be performed by pushing the master piston 41 of the master cylinder unit 40 toward the third chamber 40a (i.e., in a forward direction) to pressurize oil (i.e., brake fluid). The two-stage control refers to controlling the braking to be performed by pulling the master piston 41 of the master cylinder unit 40 toward the fourth chamber 40b (i.e., in a reverse direction) to pressurize oil.

For example, when the driver presses the brake pedal for braking, the control unit 100 generates a target pressure from the pedal stroke sensor. When the target pressure is generated, the third and fifth hydraulic control valves 53 and 55 are closed and the first, second, fourth, and sixth hydraulic control valves 51, 52, 54, and 56 are opened. In this state, when the motor 30 is rotated forward (i.e., when the single-stage control is performed), the master piston 41 (or piston) is moved forward to compress the brake fluid in the third chamber 40a of the master cylinder unit 40 so that oil is transferred to each wheel cylinder for generation of pressure, wherein the piston is moved forward until the pressure value detected by the first and second pressure sensors 90 and 95 reaches the target pressure (or required pressure).

For reference, in order to control the motor 30, a position sensor (not illustrated) continues to perform measurement, and the forward/reverse displacement of the master piston 41 of the master cylinder unit 40 connected to the shaft of the motor is measured and the pressure detected by the first pressure sensor 90 (MC1) is also monitored. In this case, when the sixth hydraulic control valve (or split shut-off valve) 56 is opened, the pressure values detected by the first and second pressure sensors 90 and 95 (MC1 and MC2) are equal to each other.

When the displacement of the master piston 41 reaches a specified specific threshold displacement (i.e., leakage determination reference displacement) after a specific time following the forward movement of the master piston 41, if the formed pressure (i.e., measured pressure) at the specific threshold displacement (i.e., leakage determination reference displacement) is not equal to or greater than a specified reference pressure (i.e., leakage determination reference pressure) and the difference between the driver's required pressure and the formed pressure (i.e., measured pressure) is equal to or more than a specified reference difference (see FIG. 2B), the control unit 100 determines that a leakage of oil (or leak) occurs somewhere.

Figure 4A:
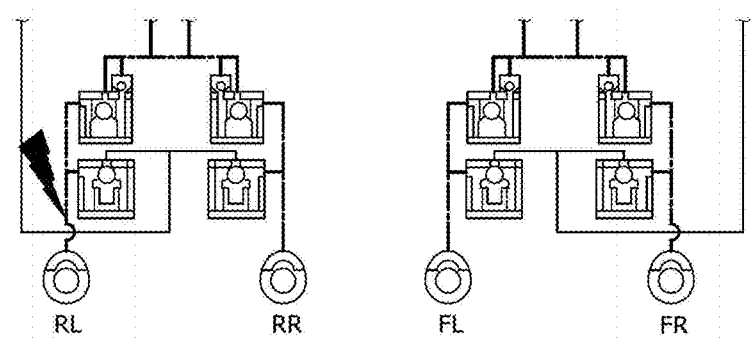
FIG. 4A, FIG. 4B, and FIG. 4C are exemplary views for explaining a method of detecting a leakage of oil during two-stage control transition operation and two-stage control operation in FIG. 1.
Figure 4B:
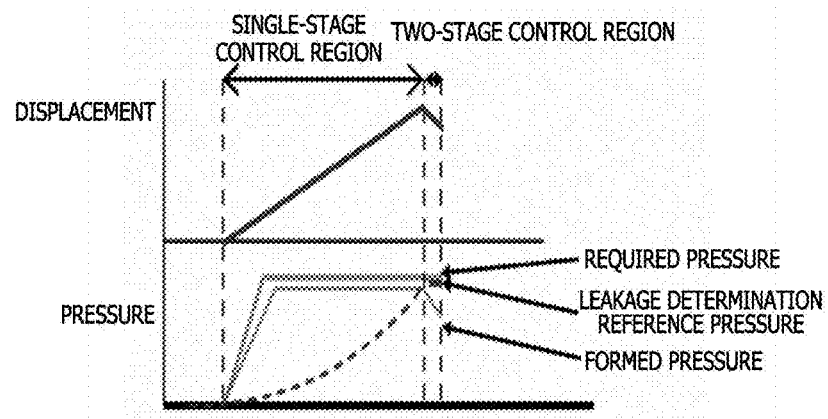
Figure 4C:
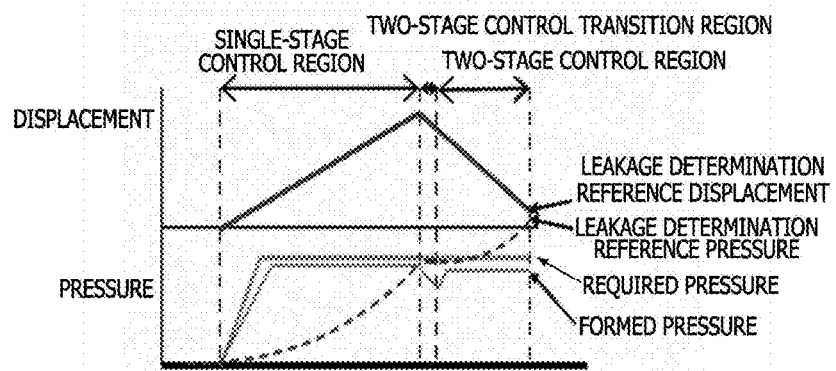

However, if the difference between the driver's required pressure and the formed pressure (i.e., measured pressure) is less than the specified reference difference (see FIG. 2C) even though the pressure corresponding to the specific threshold displacement (i.e., leakage determination reference displacement) is not equal to or greater than the specified reference pressure (i.e., leakage determination reference pressure), it is determined that it is not a dangerous situation since the driver's intention of braking is reflected, with the consequence that a suspect signal is first output and a transition to two-stage control is performed (see FIGS. 4A, 4B, and 4C).

For reference, in case of emergency braking by the driver, the first and second pressure sensors 90 and 95 may be subjected to large pressure due to the orifices (small holes for fluid jet) of the inlet valves 61 to 64 and the ambient temperature despite the leakage of oil in the ESC-integrated regenerative braking system, which may lead to no detection of the leakage of oil as the difference between the required pressure and the formed pressure may be less than the specified reference difference. Therefore, the transition to two-stage control as described above is performed under the specified specific pressure condition (e.g., $Pm=Pw+k*V+k1*VA2$).

Here, Pm is a pressure of the master cylinder unit MC1, Pw is a wheel pressure, V is a piston speed, and k and k1 are constants related to the valve orifice and the brake fluid (temperature characteristics).

In addition, the number of outputs of the suspect signal is accumulated. When the cumulative number of suspect signals is equal to or more than a predetermined reference number, it may be determined that a leakage of oil (or leak) occurs.

FIG. 3 is a flowchart for explaining the method of detecting (or determining) a leakage of oil during the single-stage control (i.e., during braking in a single-stage control region) in FIGS. 2A-2C.

Referring to FIG. 3, during the single-stage control (i.e., during the braking in the single-stage control region) (S101), the control unit 100 detects (or monitors) the displacement of the master piston 41 (or piston) and the pressure in the passage (e.g., passage toward front wheel or passage toward rear wheel) (S102).

If the displacement of the master piston 41 (or piston) is a specified reference displacement (i.e., leakage determination reference displacement) (YES in S103) and the difference in pressure (i.e., required pressure−formed pressure) is equal to or more than a specified reference pressure difference (see FIG. 2B), the control unit 100 determines that a leakage of oil occurs (S105).

However, if the difference in pressure (i.e., required pressure−formed pressure) is less than the specified reference pressure difference (see FIG. 2C), the control unit 100 outputs a suspect signal indicating that there is a possibility of leakage (S106) and performs a transition to two-stage control (S107).

FIG. 4A, FIG. 4B and FIG. 4C are exemplary views for explaining a method of detecting (or determining) a leakage of oil during two-stage control transition operation and two-stage control operation (i.e., during the braking in the two-stage control transition region or the two-stage control region) in FIG. 1.

When the user (driver) continues to brake as illustrated in FIG. 2C, for transition to two-stage control, the control unit 100 first adjusts the hydraulic control valves 51 to 56 to a specified state (e.g., the hydraulic control valves 52, 54, and 55 are kept closed while the other hydraulic control valves are maintained in the previous state), and then rotates the motor 30 in reverse to have a value equal to or greater than the pressure value before the transition (i.e., pressure value at the time of the transition from the single-stage control to the two-stage control).

For reference, if the motor 30 is rotated in reverse when the fifth hydraulic control valve 55 is not closed, the fourth chamber 40b is empty (i.e., not pressurized) so that the liquid (i.e., oil) present in the circuit (i.e., hydraulic passage) for wheel braking is pushed back to the fourth chamber 40b, resulting in a phenomenon in which the braking force on the wheel cylinder is lost. Thus, prior to performing the transition to two-stage control, after the hydraulic control valves 51 to 56 are first adjusted to the specified state, the motor 30 is rotated in reverse to have the value equal to or greater than the pressure value before the transition (i.e., pressure value at the time of the transition from the single-stage control to the two-stage control).

When the motor 30 has the value equal to or greater than the pressure value before the transition as described above, the control unit 100 rotates the motor 30 in reverse and then opens the fifth hydraulic control valve 55. In this state, similar to the leak detection situation during the single-stage control, if the formed pressure (i.e., measured pressure) when the displacement of the master piston 41 reaches a specified reference displacement (i.e., leakage determination reference displacement in the two-stage control region) is not equal to or greater than a specified leakage determination reference pressure (i.e., pressure at the time of transition (i.e., pressure at the time of single-stage control)+pressure corresponding to displacement (pressure corresponding to the displacement in the two-stage control region)) and the difference between the driver's required pressure and the formed pressure (i.e., measured pressure) is equal to or more than a specified reference difference (see FIG. 4C), the control unit 100 determines that a leakage of oil (or leak) occurs somewhere during the two-stage control.

For reference, in the state in which, for transition to two-stage control, the hydraulic control valves 51 to 56 are first adjusted to the specified states (e.g., the hydraulic control valves 52, 54, and 55 are kept closed while the other hydraulic control valves are maintained in the previous state), if a leakage of oil occurs in the ESC-integrated regenerative braking system, the liquid flows out to the leaked line even during the transition operation (i.e., in the two-stage control transition region) so that the pressure drops before entering the two-stage control region even though the user maintains braking. Therefore, the control unit 100 may determine that a leakage of oil occurs somewhere (see FIG. 4B).

Figure 5A:
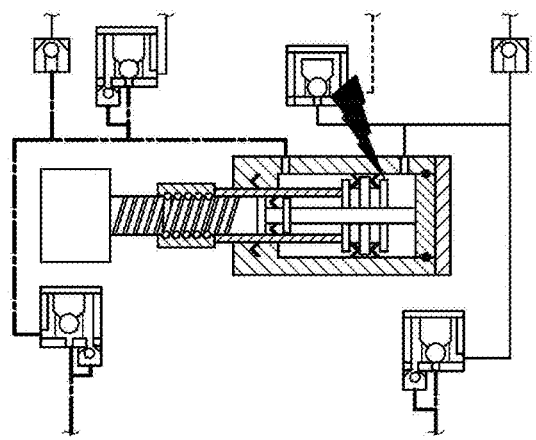
FIG. 5A and FIG. 5B are exemplary views for explaining a situation in which a normal hydraulic pressure is formed by removing foreign substances during an internal leakage of oil when the leakage of oil is suspected during the single-stage control in FIGS. 2A, 2B, and 2C.
Figure 5B:
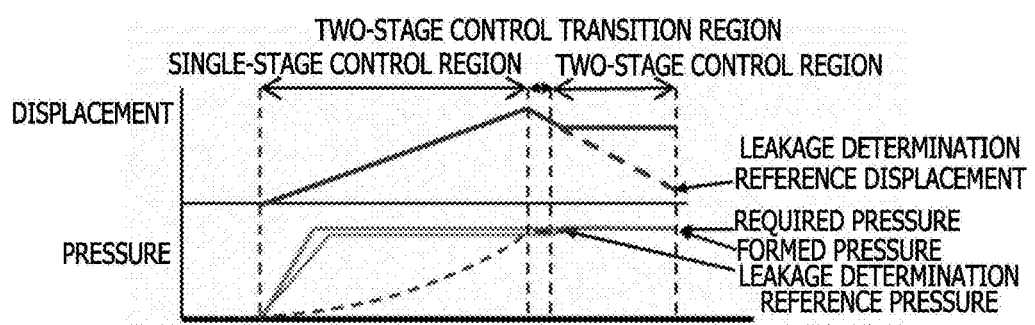

For reference, in the system (i.e., ESC-integrated regenerative braking system) according to the present embodiment, when the leakage of oil is not an external leakage (i.e., leakage of oil caused in the passage), but an internal leakage (i.e., internal leakage caused by foreign substances trapped in the hydraulic control valve, the seal cup, or the like within the ESC-integrated regenerative braking system), the third and fourth chambers 40a and 40b of the master cylinder unit 40 and the hydraulic control valves 51 to 56 are changed in the closed or opened state through the double-acting switching (i.e., switching from the single-stage control to the two-stage control) as described above. Therefore, it is possible to naturally remove foreign substances or form normal hydraulic pressure due to the natural removal of foreign substances when the user represses the brake after the brake is turned off (see FIGS. 5A and 5B).

Since the present embodiment performs the pressure control instead of the displacement control to realize the target pressure (or required pressure) as described above, it is possible to determine the leakage of oil during traveling even without using a longitudinal acceleration sensor and to determine the leakage of oil by controlling the pressure of the master cylinder unit 40 by pressing the brake pedal (e.g., when the brake pedal is pressed to start up the vehicle) even during stopping.

Figure 6:
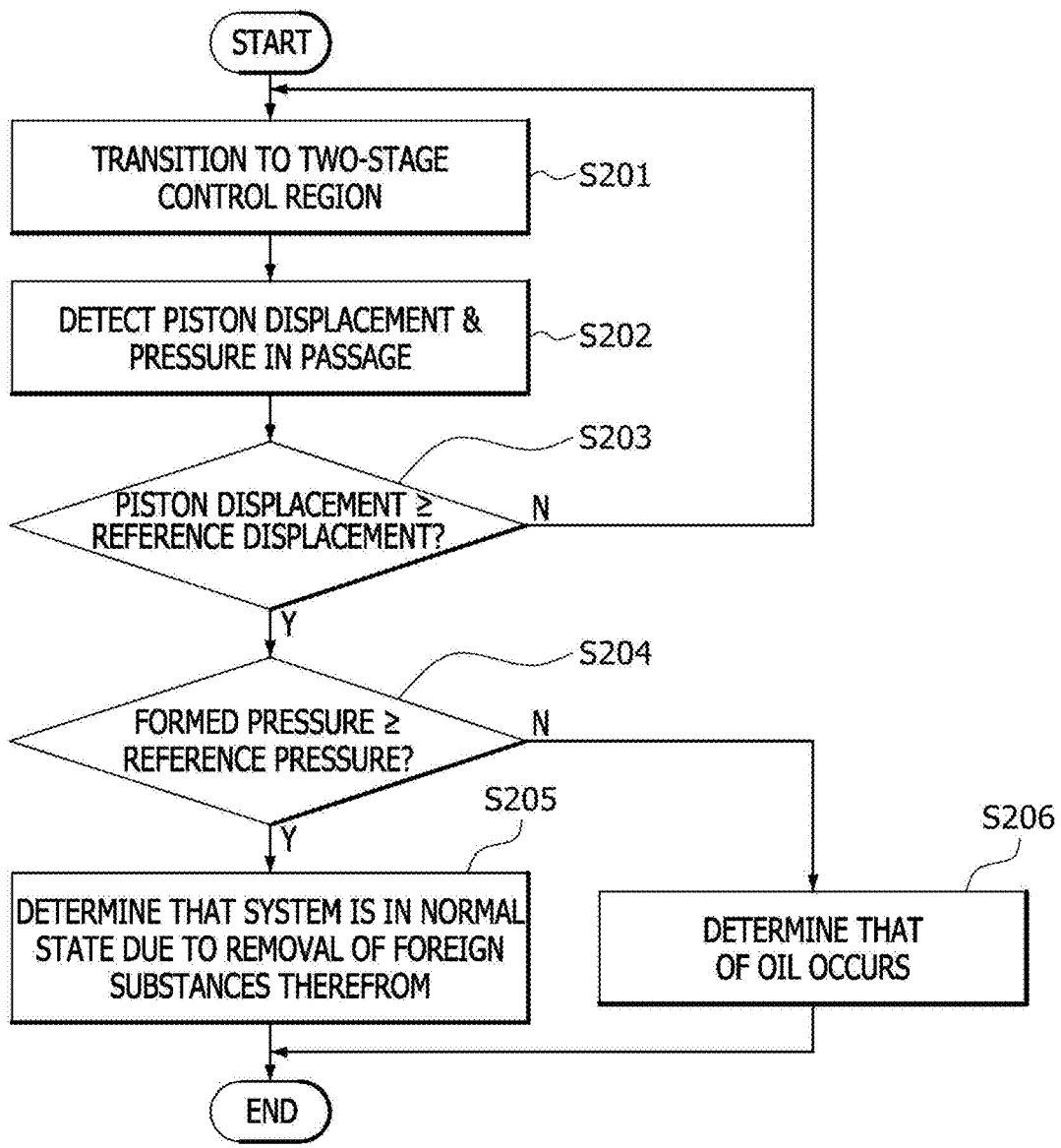
FIG. 6 is a flowchart for explaining the method of detecting a leakage of oil during the two-stage control transition operation and the two-stage control operation in FIGS. 4A, 4B, 4C, 5A, and 5B.

FIG. 6 is a flowchart for explaining the method of detecting a leakage of oil during the two-stage control transition operation and the two-stage control operation (i.e., during the braking in the two-stage control transition region or the two-stage control region) in FIGS. 4A, 4B, 4C, 5A, and 5B.

When the user (driver) continues to brake so that the process transitions to the two-stage control region as illustrated in FIG. 2C, the control unit 100 detects (or monitors) the displacement of the master piston 41 (or piston) and the pressure in the passage (e.g., passage toward front wheel or passage toward rear wheel) (S202).

If the displacement of the master piston 41 (or piston) is a specified reference displacement (i.e., leakage determination reference displacement) (YES in S203), the difference in pressure (i.e., required pressure−formed pressure) is equal to or more than a specified reference pressure difference (see FIG. 4C), and the formed pressure is smaller than a reference pressure (i.e., leakage determination reference pressure) (NO in S204), the control unit 100 determines that a leakage of oil occurs (S206).

However, if the difference in pressure (i.e., required pressure−formed pressure) is less than the specified reference pressure difference (see FIGS. 5A and 5B) and the formed pressure (i.e., measured pressure) is equal to or greater than the reference pressure (i.e., leakage determination reference pressure) (YES in S204) during the two-stage control, the control unit 100 determines that an internal leakage (leakage within the ESC-integrated regenerative braking system) occurs due to foreign substances trapped in the hydraulic control valve (or seal cup or the like) and the hydraulic control valve or seal cup is in a normal state due to removal of the foreign substances therefrom (S205).

Figure 7A:
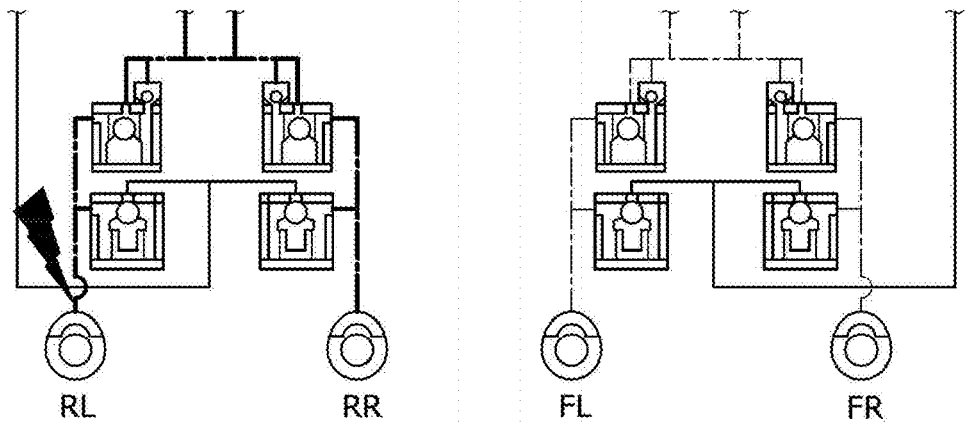
FIG. 7A and FIG. 7B are exemplary views for explaining an operation when single-stage single-acting control is performed on a front wheel after a leakage of oil is detected during the two-stage control in FIGS. 4A, 4B, and 4C, wherein the leakage of oil occurs at a rear wheel.
Figure 7B:
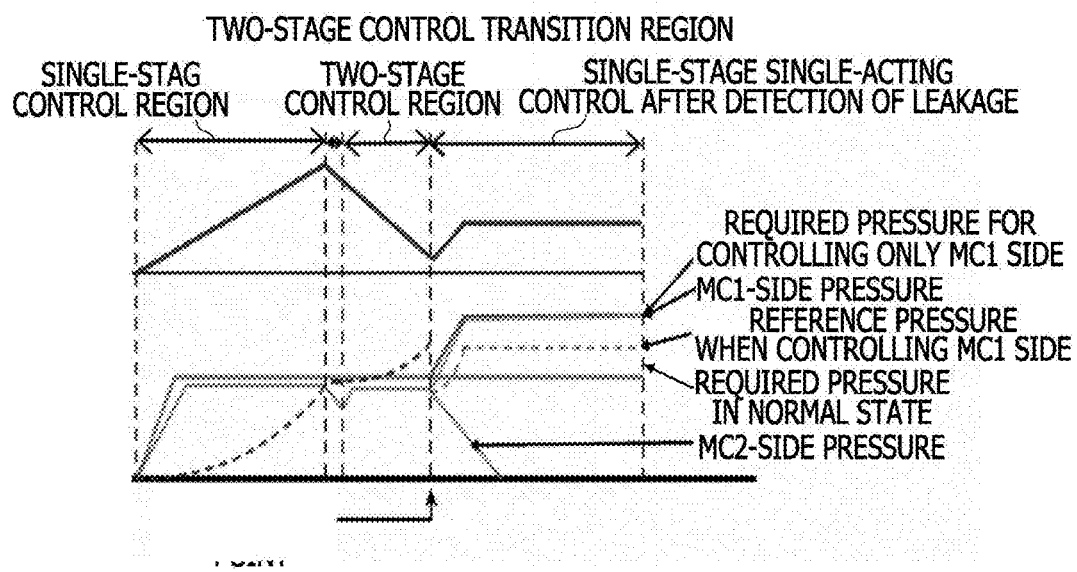
Figure 8A:
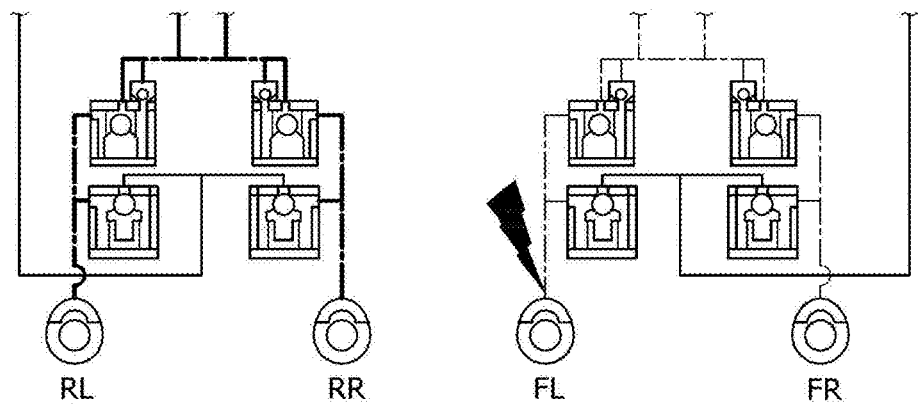
FIG. 8A and FIG. 8B are exemplary views for explaining an operation when single-stage single-acting control is performed on a front wheel after a leakage of oil is detected in FIGS. 4A, 4B, and 4C, wherein the leakage of oil occurs at the front wheel.
Figure 8B:
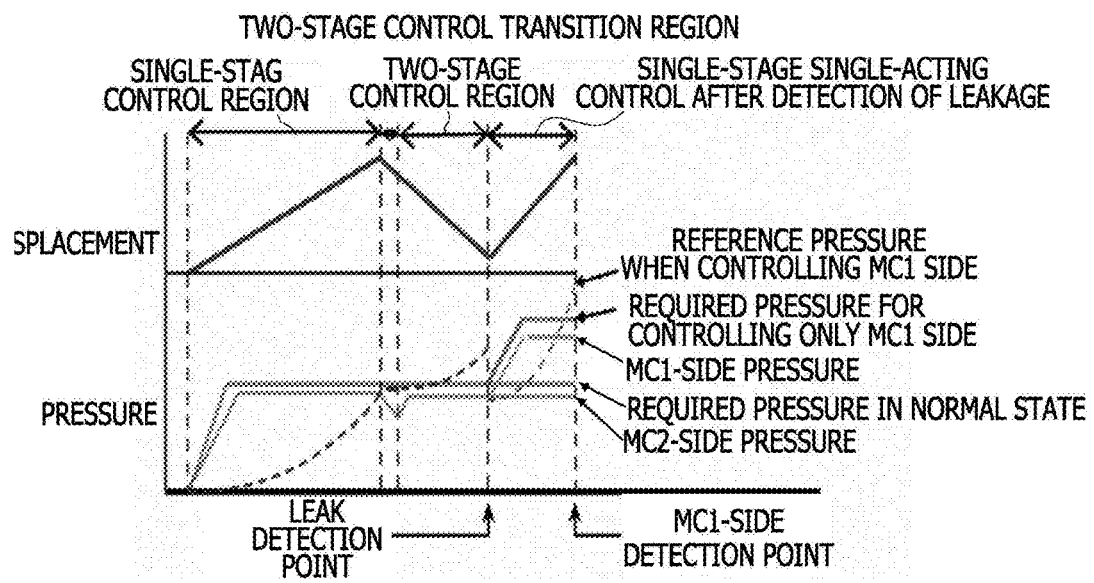

FIGS. 7A and 7B are exemplary views for explaining an operation when single-stage single-acting control is performed on a front wheel after a leakage of oil is detected during the two-stage control in FIGS. 4A, 4B, and 4C, wherein the leakage of oil occurs at a rear wheel. FIGS. 8A and 8B are exemplary views for explaining an operation when single-stage single-acting control is performed on a front wheel after a leakage of oil is detected in FIGS. 4A, 4B, and 4C, wherein the leakage of oil occurs at the front wheel. FIG. 9 is a flowchart for explaining the operation when the single-stage single-acting control is performed in directions equal to and different from the wheel direction in which the leakage of oil occurs in FIGS. 7A, 7B, 8A, and 8B.

Referring to FIGS. 7A, 7B, 8A, and 8B, the control unit 100 closes the fifth and sixth hydraulic control valves 55 and 56 after detecting a leakage of oil, to prevent a loss of liquid to the rear-wheel-side passage (i.e., hydraulic passage), in which state the control unit 100 rotates the motor 30 forward according to the driver's required pressure to generate a pressure by pressurizing the third chamber 40*a*.

In this case, since the fifth and sixth hydraulic control valves 55 and 56 are closed, no pressure is generated on the rear wheel even though the third chamber 40*a* is pressurized.

In this case, the control unit 100 brakes only one wheel (e.g., front wheel) in the leakage (or leak) situation and compensates for the required pressure to generate a required pressure higher than the reference pressure (i.e., required pressure in leak state=4-wheel braking force/front wheel braking force*required pressure in normal state), in order to realize a deceleration as in a normal state (i.e., state capable of controlling the front and rear wheels together when there is no leakage).

The control unit 100 continues to detect (monitor) the displacement of the master piston 41 and the pressure in the front-wheel-side passage detected by the first pressure sensor 90 (MC1).

In this case, if a leakage of oil occurs at the rear wheel (at MC2), the rear-wheel-side pressure (i.e., pressure detected by the second pressure sensor 95 (MC2)) continues to drop. However, since no leakage of oil occurs at the front wheel (at MC1), the front-wheel-side pressure (i.e., pressure detected by the first pressure sensor 90 (MC1)) converges on the required pressure generated by the compensation (i.e., required pressure for controlling only the MC1 side without controlling the MC2 side) to be equal to or greater than a front-wheel-side reference pressure (i.e., reference pressure when controlling the MC1 side) (see FIG. 7B).

On the other hand, if a leakage of oil occurs at the front wheel (at MC1), when the displacement of the master piston 41 reaches the leakage determination reference displacement during the single-stage single-acting control for the front wheel after the leakage of oil is detected during the two-stage control, the front-wheel-side (i.e., MC1-side) formed pressure (i.e., measured pressure) is not equal to or greater than a specified leakage determination reference pressure (i.e., pressure at the time of transition+pressure corresponding to piston displacement) and the difference between the driver's front-wheel-side (i.e., MC1-side) required pressure and the formed pressure (i.e., measured MC1-side pressure) is equal to or more than a specified reference difference (see FIG. 8B).

In the present embodiment as described above, when the leakage of oil (or leak) is detected during the braking (e.g., two-stage control), the braking force in one passage of the front-wheel-side and rear-wheel-side passages (or circuit) is kept constant while only the braking force in the other passage is controlled. Therefore, it is possible to maintain at least a certain level or more of braking force (i.e., braking force corresponding to the pressure maintained by closing the hydraulic control valve) even if it is difficult to form a pressure due to the leakage in one circuit.

Referring to FIG. 9, if a leakage of oil is detected during the two-stage control (S301), the control unit 100 first shuts off (closes) a rear-wheel-directed (MC2-side) passage valve (i.e., fifth hydraulic control valve 55) and a split shut-off valve (i.e., sixth hydraulic control valve 56) (S302), and switches to single-stage single-acting control for the front wheel (S303).

In this case, since the fifth and sixth hydraulic control valves 55 and 56 are closed, no pressure is generated on the rear wheel (i.e., rear-wheel-side wheel cylinder) even though the third chamber 40*a* of the master cylinder unit 40 is pressurized.

In this case, the control unit 100 brakes only one wheel (e.g., front wheel) in the leakage (or leak) situation and compensates for the required pressure to generate a required pressure higher than the reference pressure (i.e., required pressure in leak state=4-wheel braking force/front wheel braking force*required pressure in normal state), in order to realize a deceleration as in a normal state (i.e., state capable of controlling the front and rear wheels together when there is no leakage) (S304).

The control unit 100 continues to detect (monitor) the displacement of the master piston 41 and the pressure in the front-wheel-side passage detected by the first pressure sensor 90 (MC1) (S305).

Thus, when the displacement of the master piston 41 reaches the leakage determination reference displacement (YES in S306), if the front-wheel-side (i.e., MC1-side) formed pressure (i.e., measured pressure) is smaller than a specified leakage determination reference pressure (i.e., reference pressure when controlling the MC1 side, which is pressure at the time of transition+pressure corresponding to piston displacement) and the difference in pressure (i.e., required pressure for front-wheel-side (i.e., MC1-side) control−MC1-side pressure) is equal to or more than a predetermined reference pressure difference (YES in S307) (see FIG. 8B), the control unit 100 determines that a leakage of oil (or leak) occurs at the front wheel (i.e., at MC1) (S308).

When the displacement of the master piston 41 reaches the leakage determination reference displacement (YES in S306), if the front-wheel-side (i.e., MC1-side) formed pressure (i.e., measured pressure) is equal to or greater than the specified leakage determination reference pressure (i.e., reference pressure when controlling the MC1 side, which is pressure at the time of transition+pressure corresponding to piston displacement) and the difference in pressure (i.e., required pressure for front-wheel-side (i.e., MC1-side) control−MC1-side pressure) is less than the predetermined reference pressure difference (NO in S307), the control unit 100 determines that a leakage of oil (or leak) occurs at the rear wheel (i.e., at MC2) (S309). In this case, the formed pressure (MC2-side pressure) continues to drop at the rear wheel (i.e., at MC2) without performing pressure control (see FIG. 7B).

Figure 10A:
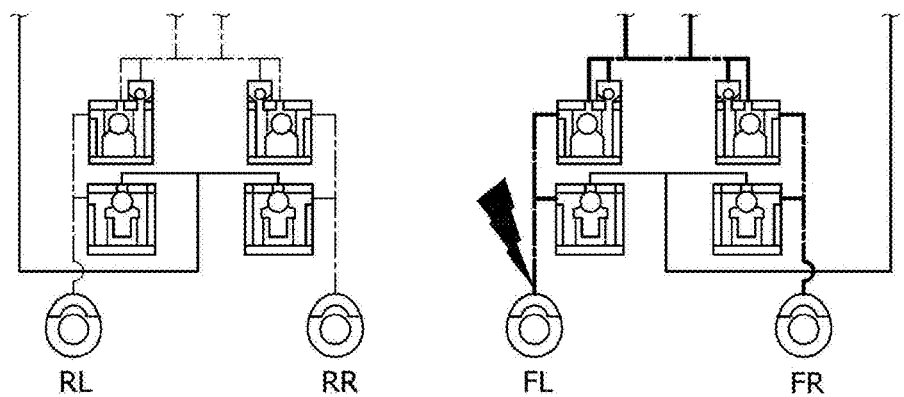
FIG. 10A and FIG. 10B are exemplary views for explaining an operation when two-stage single-acting control is performed on a rear wheel after a leakage of oil is detected in FIGS. 4A, 4B, and 4C, wherein the leakage of oil occurs at a front wheel.
Figure 10B:
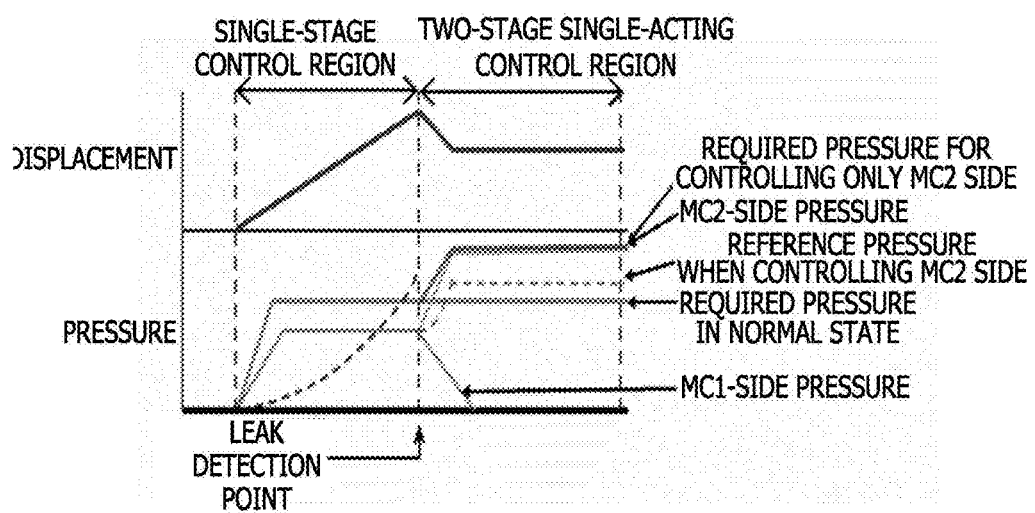
Figure 11A:
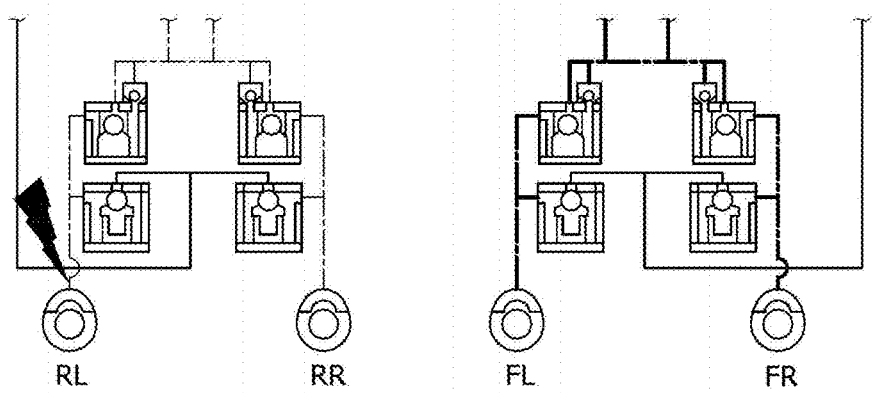
FIG. 11A and FIG. 11B are exemplary views for explaining an operation when two-stage single-acting control is performed on a rear wheel after a leakage of oil is detected in FIGS. 4A, 4B, and 4C, wherein the leakage of oil occurs at the rear wheel.
Figure 11B:
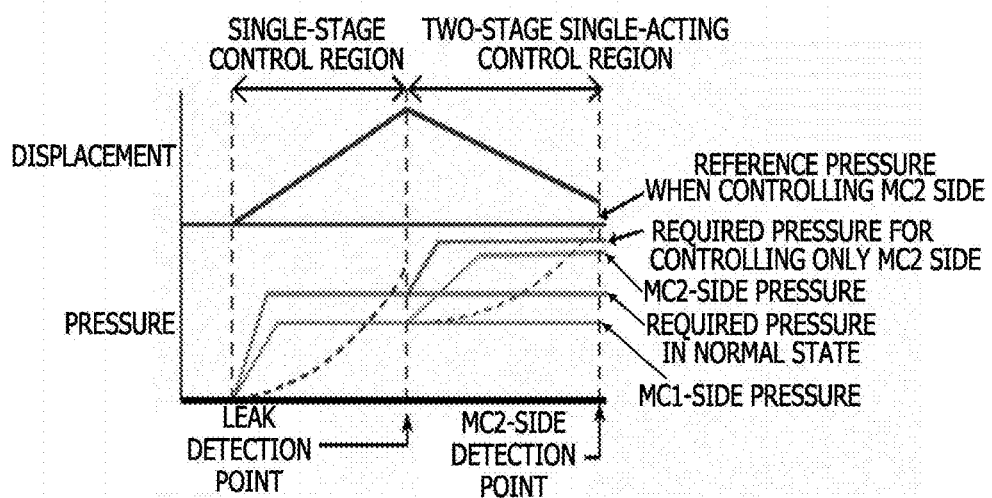
Figure 12:
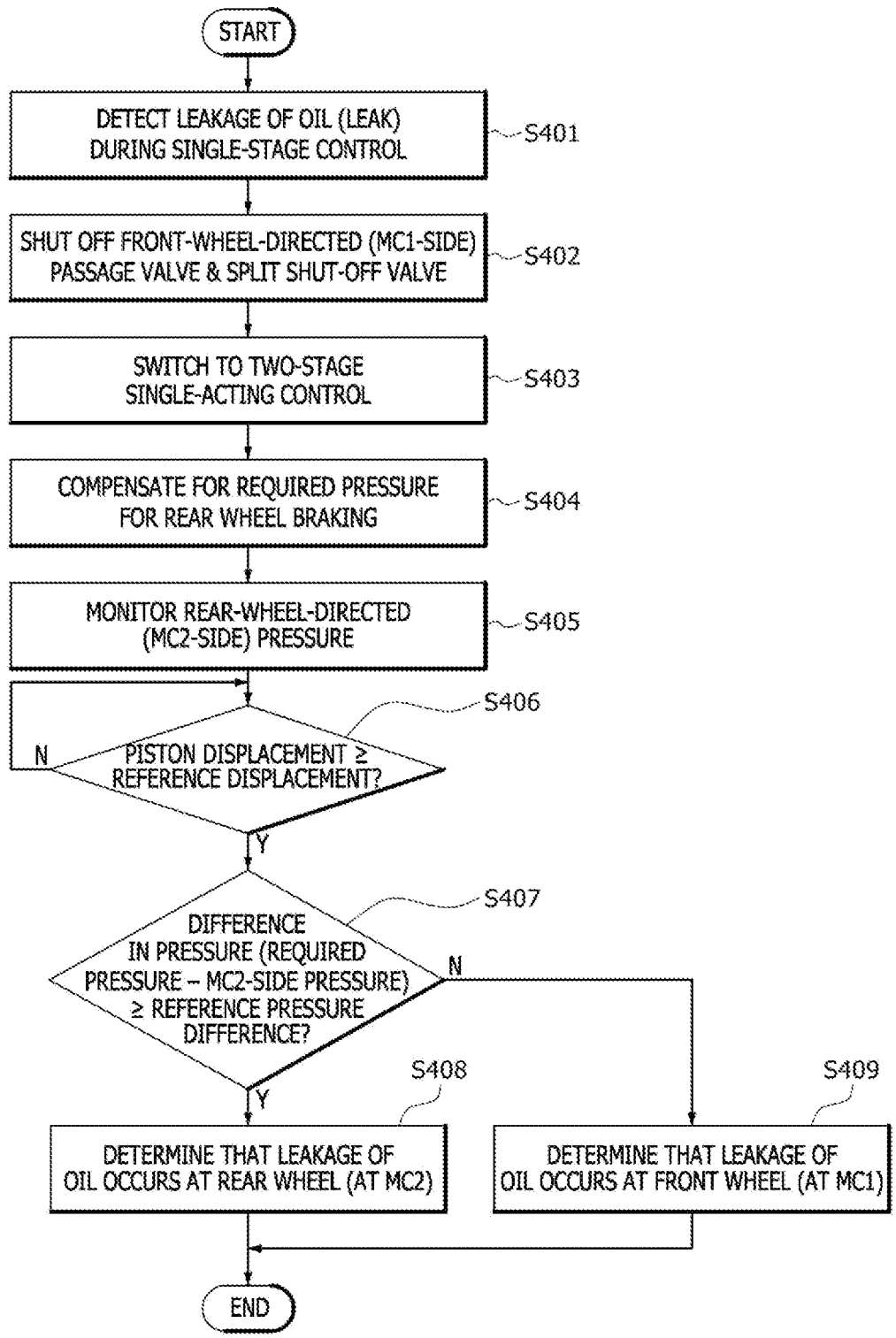
FIG. 12 is a flowchart for explaining the operation when the two-stage single-acting control is performed in directions equal to and different from the wheel direction in which the leakage of oil occurs in FIGS. 10A, 10B, 11A, and 11B.

FIGS. 10A and 10B are exemplary views for explaining an operation when two-stage single-acting control is performed on a rear wheel after a leakage of oil is detected in FIGS. 4A, 4B, and 4C, wherein the leakage of oil occurs at a front wheel. FIGS. 11A and 11B are exemplary views for explaining an operation when two-stage single-acting control is performed on a rear wheel after a leakage of oil is detected in FIGS. 4A, 4B, and 4C, wherein the leakage of oil occurs at the rear wheel. FIG. 12 is a flowchart for explaining the operation when the two-stage single-acting control is performed in directions equal to and different from the wheel direction in which the leakage of oil occurs in FIGS. 10A, 10B, 11A, and 11B.

Referring to FIGS. 10A, 10B, 11A, and 11B, the control unit 100 performs a transition to two-stage single-acting control for the rear wheel after detecting a leakage of oil during the single-stage control. That is, for the transition to two-stage single-acting control for the rear wheel, the control unit 100 closes the second and sixth hydraulic control valves 52 and 56 to prevent a loss of liquid to the front-wheel-side passage, in which state the control unit 100 rotates the motor 30 in reverse according to the driver's required pressure to generate a pressure by pressurizing the fourth chamber 40*b* of the master cylinder unit 40.

In this case, since the second and sixth hydraulic control valves 52 and 56 are closed, no pressure is generated on the front wheel (i.e., front-wheel-side wheel cylinder) even though the fourth chamber 40b is pressurized for the two-stage single-acting control for the rear wheel.

In this case, the control unit 100 brakes only one wheel (e.g., rear wheel) in the leakage (or leak) situation and compensates for the required pressure to generate a required pressure higher than the reference pressure (i.e., required pressure in leak state=4-wheel braking force/rear wheel braking force*required pressure in normal state), in order to realize a deceleration as in a normal state (i.e., state capable of controlling the front and rear wheels together when there is no leakage).

The control unit 100 continues to detect (monitor) the displacement of the master piston 41 and the pressure in the rear-wheel-side passage detected by the second pressure sensor 95 (MC2).

In this case, if a leakage of oil occurs at the front wheel (at MC1) (see FIG. 10B), the front-wheel-side pressure (i.e., pressure detected by the first pressure sensor 90) continues to drop. However, the rear-wheel-side pressure (i.e., pressure detected by the second pressure sensor 95) converges on the required pressure generated by the compensation (i.e., required pressure for controlling only the MC2 side without controlling the MC1 side) to be equal to or greater than a rear-wheel-side reference pressure (i.e., reference pressure when controlling the MC2 side) (see FIG. 10B).

On the other hand, if a leakage of oil occurs at the rear wheel (at MC2) (see FIG. 11B), when the displacement of the master piston 41 reaches the leakage determination reference displacement during the two-stage single-acting control for the rear wheel after the leakage of oil is detected during the single-stage control, the rear-wheel-side (i.e., MC2-side) formed pressure (i.e., measured MC2-side pressure) is smaller than a specified leakage determination reference pressure (i.e., reference pressure when controlling the MC2 side, which is pressure at the time of transition+pressure corresponding to piston displacement) and the difference between the driver's rear-wheel-side (i.e., MC2-side) required pressure and the formed pressure (i.e., measured MC2-side pressure) is equal to or more than a specified reference difference (see FIG. 11B).

Referring to FIG. 12, if a leakage of oil is detected during the single-stage control (S401), the control unit 100 shuts off (closes) a front-wheel-directed (MC1-side) passage valve (i.e., second hydraulic control valve 52) and a split shut-off valve (i.e., sixth hydraulic control valve 56) (S402), and switches to two-stage single-acting control for the rear wheel (S403).

In this case, since the second and sixth hydraulic control valves 52 and 56 are closed, no pressure is generated on the front wheel even though the fourth chamber 40b of the master cylinder unit 40 is pressurized.

In this case, the control unit 100 brakes only one wheel (e.g., rear wheel) in the leakage (or leak) situation and compensates for the required pressure to generate a required pressure higher than the reference pressure (i.e., required pressure in leak state=4-wheel braking force/rear wheel braking force*required pressure in normal state), in order to realize a deceleration as in a normal state (i.e., state capable of controlling the front and rear wheels together when there is no leakage) (S404).

The control unit 100 continues to detect (monitor) the displacement of the master piston 41 and the pressure in the rear-wheel-side passage detected by the second pressure sensor 95 (MC2) (S405).

Thus, when the displacement of the master piston 41 reaches the leakage determination reference displacement (YES in S406), if the rear-wheel-side (i.e., MC2-side) formed pressure (i.e., measured MC2-side pressure) is smaller than a specified leakage determination reference pressure (i.e., reference pressure when controlling the MC2 side, which is pressure at the time of transition+pressure corresponding to piston displacement) and the difference in pressure (i.e., required pressure for only rear-wheel-side (i.e., MC2-side) control−MC2-side pressure) is equal to or more than a predetermined reference pressure difference (YES in S407) (see FIG. 11(b)), the control unit 100 determines that a leakage of oil (or leak) occurs at the rear wheel (i.e., at MC2) (S408).

When the displacement of the master piston 41 reaches the leakage determination reference displacement (YES in S406), if the rear-wheel-side (i.e., MC2-side) formed pressure (i.e., measured MC2-side pressure) is equal to or greater than the specified leakage determination reference pressure (i.e., reference pressure when controlling the MC2 side, which is pressure at the time of transition+pressure corresponding to piston displacement) and the difference in pressure (i.e., required pressure for only rear-wheel-side (i.e., MC2-side) control−MC2-side pressure) is less than the predetermined reference pressure difference (NO in S407), the control unit 100 determines that a leakage of oil (or leak) occurs at the front wheel (i.e., at MC1) (S409).

In FIGS. 10A, 10B, 11A, 11B, and 12, the method has been described of detecting a leakage of oil when the two-stage single-acting control is performed on the rear wheel when the pressure sensor (i.e., second pressure sensor) is provided on the rear wheel.

Figure 13A:
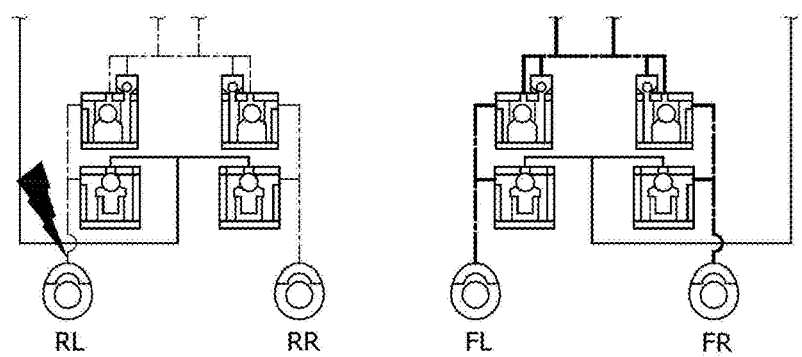
FIG. 13A and FIG. 13B are exemplary views for explaining a method of detecting a rear-wheel-side leakage using a motor current when two-stage single-acting control is performed on a rear wheel with no pressure sensor after a leakage of oil is detected in FIGS. 4A, 4B, and 4C.
Figure 13B:
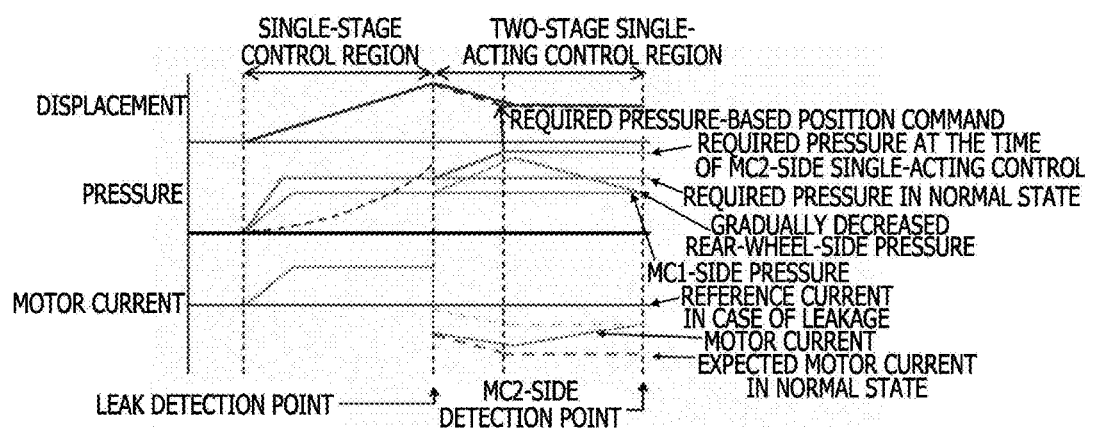
Figure 14:
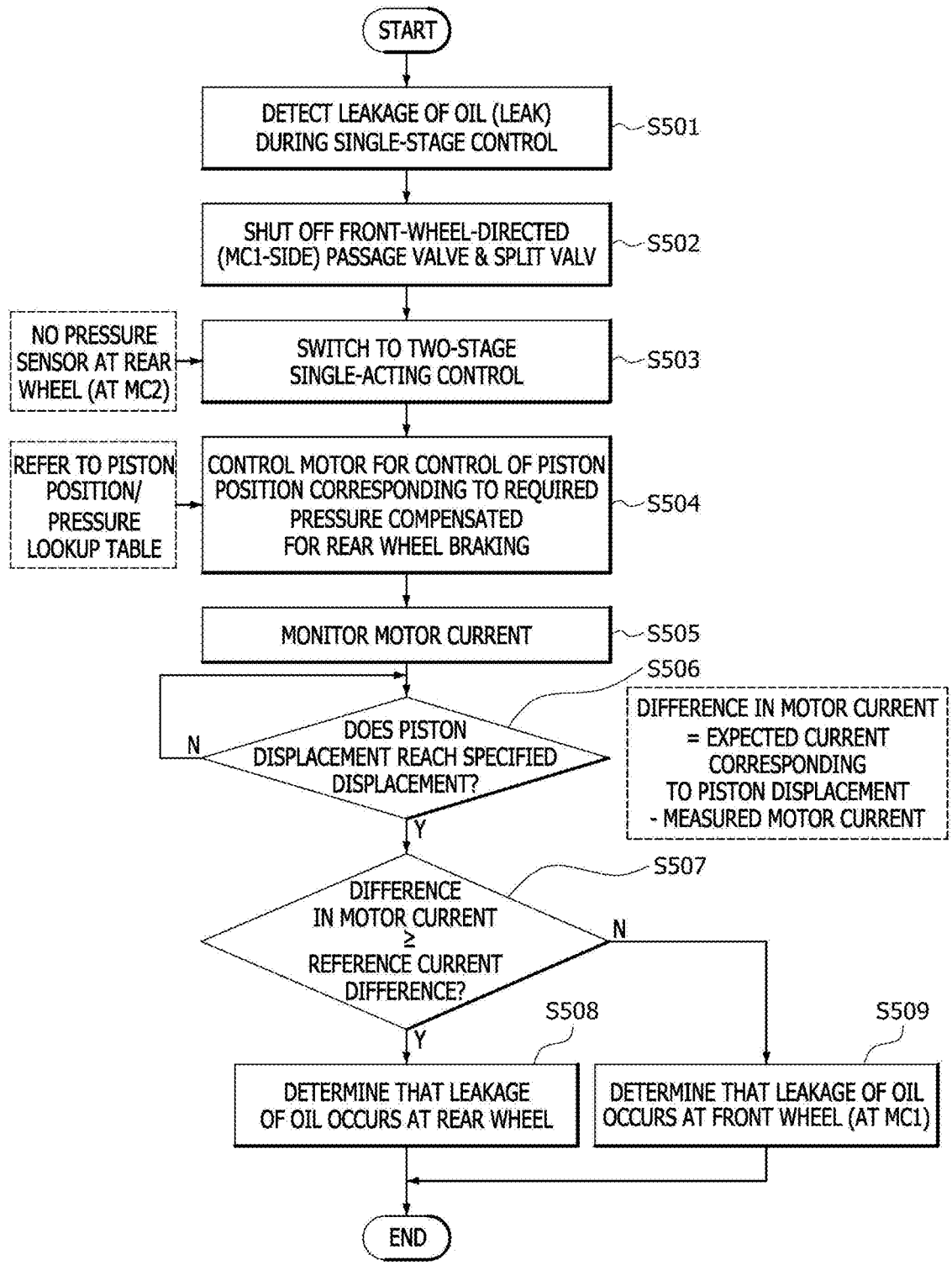
FIG. 14 is a flowchart for explaining the method of detecting a rear-wheel-side leakage using a motor current when the two-stage single-acting control is performed on the rear wheel with no pressure sensor in FIGS. 13A and 13B.

FIGS. 13A and 13B are exemplary views for explaining a method of detecting a rear-wheel-side leakage using a motor current when two-stage single-acting control is performed on a rear wheel with no pressure sensor after a leakage of oil is detected in FIGS. 4A, 4B, and 4C. FIG. 14 is a flowchart for explaining the method of detecting a rear-wheel-side leakage using a motor current when the two-stage single-acting control is performed on the rear wheel with no pressure sensor in FIGS. 13A and 13B.

As described above, the second pressure sensor 95 may be deleted for cost reduction. In the case where the second pressure sensor 95 is deleted, a method will be described of detecting a leakage of oil at the rear wheel (i.e., at MC2) during rear wheel braking by the two-stage single-acting control.

Referring to FIGS. 13A, 13B, and 14, when a leakage of oil (or leak) is detected during the single-stage control (S501), the control unit 100 shuts off a front-wheel-directed (MC1-side) passage valve (i.e., second hydraulic control valve 52) and a split shut-off valve (i.e., sixth hydraulic control valve 56) according to a specified algorithm (S502), and switches to two-stage single-acting control for the rear wheel (S503).

In this case, the control unit 100 brakes only one wheel (e.g., rear wheel) in the leakage (or leak) situation and compensates for the required pressure to generate a required pressure higher than the reference pressure (i.e., required pressure in leak state=4-wheel braking force/rear wheel braking force*required pressure in normal state), in order to realize a deceleration as in a normal state (i.e., state capable of controlling the front and rear wheels together when there is no leakage).

In this case, the motor 30 is controlled to make the piston displacement corresponding to the required pressure (i.e., required pressure at the time of MC-side single-acting control) (S504). That is, since the pressure in the rear-wheel-side passage may not be monitored because there is no second pressure sensor 95 in the present embodiment, the motor 30 is controlled to make the piston displacement corresponding to the required pressure (i.e., required pressure at the time of MC-side single-acting control) with reference to a specified lookup table (not illustrated).

The control unit 100 does not monitor a pressure but continues to detect (monitor) the current of the motor 30 (S505).

Thus, when the displacement of the master piston 41 reaches a specified displacement (YES in S506), if the difference in motor current (i.e., expected current corresponding to piston displacement−measured motor current) is more than a predetermined reference current difference (YES in S507), the control unit 100 determines that a leakage of oil occurs at the rear wheel (S508).

That is, if a leakage of oil occurs at the rear wheel, the pressure in the rear wheel may not be measured due to the deletion of the second pressure sensor 95, but the internal pressure of the rear wheel gradually decreases and thus the load of the motor (i.e., repulsive force due to the pressure in the rear-wheel-side passage) decreases after the displacement of the master piston 41 is kept constant. Therefore, the motor current gradually decreases over time, so that the difference between the motor current and the expected current further increases.

On the other hand, when the displacement of the master piston 41 reaches a specified displacement (YES in S506), if the difference in motor current (i.e., expected current corresponding to piston displacement−measured motor current) is less than or equal to the predetermined reference current difference (NO in S507), the control unit 100 may determine that a leakage of oil occurs at the front wheel (i.e., at MC1) (S509) because the load of the motor (i.e., repulsive force due to the pressure in the rear-wheel-side passage) is not decreased as the pressure in the rear-wheel-side passage is not decreased.

In the present embodiment as described above, it is possible to stably detect the leakage of oil even during braking and ensure the braking force by reflecting the driver's intention of braking even while oil is leaking in the ESC-integrated braking system.

While various embodiments have been described above, it will be understood by those skilled in the art that the embodiments described are by way of example only. It will be apparent to those skilled in the art that various modifications and other equivalent embodiments may be made without departing from the spirit and scope of the disclosure. Accordingly, the true technical protection scope of the disclosure should be defined by the appended claims. In addition, the implementations described herein may be realized, for example, by a method or process, an apparatus, a software program, or a data stream or signal. Although discussed only in the context of a single form of implementation (e.g., discussed only by a method), the implementations of features discussed may also be realized in other forms (e.g., devices or programs). The apparatus may be embodied in suitable hardware, software, firmware, and the like. The method may be embodied, for example, in a device such as a processor, generally referring to a processing device, including a computer, a microprocessor, an integrated circuit or a programmable logic device, and the like. The processor also includes communication devices such as computers, cell phones, portable/personal digital assistants ("PDAs"), and other devices that facilitate communication of information between end-users.

What is claimed is:

1. An apparatus for controlling an ESC-integrated regenerative braking system, comprising:
    a pedal cylinder unit connected to a reservoir unit storing oil therein, the pedal cylinder unit configured to generate a hydraulic pressure by pressing a brake pedal;
    a motor configured to be driven by an electrical signal output in response to a displacement of the brake pedal;
    a master cylinder unit connected to the pedal cylinder unit and configured to form a hydraulic pressure for braking through a master piston moving forward and backward by the driving of the motor;
    a control unit configured to detect a leakage of oil while a vehicle is traveling or stops, based on a change in pressure in a hydraulic passage, during at least one of a plurality of controls of the master cylinder unit; and
    a hydraulic control valve provided in the hydraulic passage for connecting the reservoir unit to a wheel cylinder configured to brake each wheel, the hydraulic control valve being opened and closed under control of the control unit,
    wherein, if a difference in pressure defined as required pressure−formed pressure is less than a specified reference pressure difference, the control unit outputs a suspect signal indicating there is a possibility of the leakage of oil, accumulates a number of outputs of the suspect signal, and when the accumulated number of outputs of the suspect signal is equal to or more than a predetermined reference number, determines that the leakage of oil occurs.

2. The apparatus according to claim 1, wherein the hydraulic control valve comprises:
    a first hydraulic control valve configured to regulate a hydraulic pressure in a hydraulic passage for connecting the reservoir unit to a first chamber of the pedal cylinder unit;
    a second hydraulic control valve configured to regulate a hydraulic pressure in a hydraulic passage for connecting the first chamber of the pedal cylinder unit to a fourth chamber of the master cylinder unit;
    a third hydraulic control valve configured to regulate a hydraulic pressure in a hydraulic passage for connecting a second chamber of the pedal cylinder unit to a third chamber of the master cylinder unit;
    a fourth hydraulic control valve configured to regulate a hydraulic pressure in a hydraulic passage for connecting the third chamber of the master cylinder unit to the wheel cylinder;
    a fifth hydraulic control valve configured to regulate a hydraulic pressure in a hydraulic passage for connecting the fourth chamber of the master cylinder unit to the wheel cylinder; and
    a sixth hydraulic control valve configured to regulate a hydraulic pressure in a hydraulic passage for connecting the fourth hydraulic control valve to the fifth hydraulic control valve.

3. The apparatus according to claim 2, wherein:
    when the leakage of oil is detected during two-stage control, the control unit shuts off the fifth hydraulic control valve for regulating a hydraulic pressure in a rear-wheel-side hydraulic passage and the sixth hydraulic control valve as a split shut-off valve and switches to single-stage single-acting control for a front wheel; and
    during the single-stage single-acting control, when a displacement of the master piston reaches a specified leakage determination reference displacement, if a front-wheel-side formed pressure is less than a specified leakage determination reference pressure, defined as a reference pressure when controlling a front-wheel-side wheel cylinder, which is pressure at the time of transition+pressure corresponding to piston displacement, and a front-wheel side difference in pressure, defined as required pressure for front-wheel-side wheel cylinder control−pressure in a front-wheel-side hydraulic passage, is equal to or greater than a predetermined reference pressure difference, the control unit determines that the leakage of oil occurs in the front-wheel-side hydraulic passage.

4. The apparatus according to claim 3, wherein the control unit brakes only the front wheel during the single-stage single-acting control, and compensates for the required pressure to generate a required pressure higher than the reference pressure, based on a predetermined equation, in order to realize a deceleration as in a normal state in which front and rear wheels are controllable together when there is no leakage.

5. The apparatus according to claim 2, wherein:
when the leakage of oil is detected during single-stage control, the control unit shuts off the fourth hydraulic control valve for regulating a hydraulic pressure in a front-wheel-side hydraulic passage and the sixth hydraulic control valve as a split shut-off valve and switches to two-stage single-acting control for a rear wheel; and
during the two-stage single-acting control, when a displacement of the master piston reaches a specified leakage determination reference displacement, if a rear-wheel-side formed pressure is less than a specified leakage determination reference pressure defined as a reference pressure when controlling a rear-wheel-side wheel cylinder, which is pressure at the time of transition+pressure corresponding to piston displacement, and a rear-wheel side difference in pressure defined as required pressure for rear-wheel-side wheel cylinder control−pressure in a rear-wheel-side hydraulic passage, is equal to or greater than a predetermined reference pressure difference, the control unit determines that the leakage of oil occurs in the rear-wheel-side hydraulic passage.

6. The apparatus according to claim 5, wherein when the displacement of the master piston reaches the specified leakage determination reference displacement, if the rear-wheel-side formed pressure is equal to or greater than the specified leakage determination reference pressure and the rear-wheel side difference in pressure is less than the predetermined reference pressure difference, the control unit determines that the leakage of oil occurs in the front-wheel-side hydraulic passage.

7. The apparatus according to claim 5, wherein the control unit brakes only the rear wheel during the two-stage single-acting control, and compensates for the required pressure to generate a required pressure higher than the reference pressure, based on a predetermined equation, in order to realize a deceleration as in a normal state in which front and rear wheels are controllable together when there is no leakage.

8. The apparatus according to claim 1, wherein:
the at least one of the plurality of controls of the master cylinder unit comprises single-stage control, two-stage control, single-stage single-acting control, and two-stage single-acting control;
the single-stage control is defined as controlling the braking to be performed by pushing the master piston of the master cylinder unit toward a third chamber to pressurize oil;
the two-stage control is defined as controlling the braking to be performed by pulling the master piston of the master cylinder unit toward a fourth chamber to pressurize oil;
the single-stage single-acting control is defined as controlling the braking to be performed only by a front-wheel-side wheel cylinder through the single-stage control; and
the two-stage single-acting control is defined as controlling the braking to be performed only by a rear-wheel-side wheel cylinder through the two-stage control.

9. The apparatus according to claim 1, wherein:
the control unit monitors a displacement of the master piston and a pressure in the hydraulic passage using a pressure sensor during single-stage control of the master cylinder unit;
when the displacement of the master piston is the specified leakage determination reference displacement, if the difference in pressure is equal to or greater than the specified reference pressure difference, the control unit determines that the leakage of oil occurs; and
if the difference in pressure is less than the specified reference pressure difference, the control unit outputs a suspect signal indicating that there is a possibility of leakage and performs a transition to two-stage control.

10. The apparatus according to claim 1, wherein:
when single-stage control transitions to two-stage control, the control unit monitors a displacement of the master piston and a pressure in the hydraulic passage;
when the displacement of the master piston is a specified leakage determination reference displacement, if the difference in pressure is equal to or greater than the specified reference pressure difference and the formed pressure is less than a specified leakage determination reference pressure, the control unit determines that the leakage of oil occurs; and
after the transition to the two-stage control, if the difference in pressure is less than the specified reference pressure difference and the formed pressure is equal to or greater than the specified leakage determination reference pressure, the control unit determines that an internal leakage occurs due to foreign substances trapped in the hydraulic control valve or a seal cup and the hydraulic control valve or seal cup is in a normal state due to removal of the foreign substances therefrom.

11. The apparatus according to claim 1, wherein: when the leakage of oil is detected during a single-stage control without a pressure sensor for detecting a pressure of a rear-wheel-side hydraulic passage, the control unit shuts off a second hydraulic control valve for regulating a hydraulic pressure in a front-wheel-side hydraulic passage and a sixth hydraulic control valve as a split shut-off valve and switches to a two-stage single-acting control for a rear wheel;
for the two-stage single-acting control for the rear wheel, the control unit controls a motor of the master cylinder unit to make a piston displacement corresponding to a predetermined required pressure and continues to monitor a current of the motor; and
after a displacement of the master piston reaches a specified displacement, if a difference in motor current, defined as an expected current corresponding to the piston displacement−a measured motor current, is greater than a predetermined reference current difference, the control unit determines that the leakage of oil occurs in the rear-wheel-side hydraulic passage.

12. The apparatus according to claim 11, wherein after the displacement of the master piston reaches the specified displacement, if the difference in motor current is less than or equal to the predetermined reference current difference, the control unit determines that the leakage of oil occurs in the front-wheel-side hydraulic passage.

13. A method of controlling an ESC-integrated regenerative braking system using a control unit, for detecting a leakage of oil while a vehicle is traveling or stops, based on a change in pressure in a hydraulic passage, during at least one of a plurality of controls of a master cylinder unit of an ESC-integrated regenerative braking system, the method comprising:
monitoring a displacement of a master piston and a pressure in the hydraulic passage using a pressure sensor during single-stage control of the master cylinder unit;
when the displacement of the master piston is a specified leakage determination reference displacement, determining that the leakage of oil occurs if a difference in pressure defined as required pressure−formed pressure, is equal to or greater than a specified reference pressure difference;
outputting a suspect signal indicating that there is a possibility of leakage and performing a transition to two-stage control if the difference in pressure is less than the specified reference pressure difference;
wherein, if the difference in pressure is less than the specified reference pressure difference, the control unit accumulates a number of outputs of the suspect signal, and when the accumulated number of outputs of the suspect signal is equal to or more than a predetermined reference number, determines that the leakage of oil occurs.

14. The method according to claim 13, further comprising, when the single-stage control transitions to the two-stage control,
monitoring the displacement of the master piston and the pressure in the hydraulic passage, and when the displacement of the master piston is the specified leakage determination reference displacement, determining that the leakage of oil occurs if the difference in pressure is equal to or greater than the specified reference pressure difference and the formed pressure is less than a specified leakage determination reference pressure; and
after the transition to the two-stage control, determining that an internal leakage occurs due to foreign substances trapped in a hydraulic control valve or a seal cup and the hydraulic valve or seal cup is in a normal state due to removal of the foreign substances therefrom if the difference in pressure is less than the specified reference pressure difference and the formed pressure is equal to or greater than the specified leakage determination reference pressure.

15. The method according to claim 13, further comprising, when the leakage of oil is detected during the two-stage control:
shutting off a fifth hydraulic control valve for regulating a hydraulic pressure in a rear-wheel-side hydraulic passage and a sixth hydraulic control valve as a split shut-off valve and switching to single-stage single-acting control for a front wheel; and
during the single-stage single-acting control, when the displacement of the master piston reaches the specified leakage determination reference displacement, determining that the leakage of oil occurs in a front-wheel-side hydraulic passage if a front-wheel-side formed pressure is less than a specified leakage determination reference pressure defined as a reference pressure when controlling a front-wheel-side wheel cylinder, which is pressure at the time of transition+pressure corresponding to piston displacement, and a front-wheel side difference in pressure defined as required pressure for front-wheel-side wheel cylinder control−pressure in a front-wheel-side hydraulic passage, is equal to or greater than a predetermined reference pressure difference.

16. The method according to claim 13, further comprising, when the leakage of oil is detected during the single-stage control:
shutting off a fourth hydraulic control valve for regulating a hydraulic pressure in a front-wheel-side hydraulic passage and a sixth hydraulic control valve as a split shut-off valve and switching to two-stage single-acting control for a rear wheel; and
during the two-stage single-acting control, when the displacement of the master piston reaches the specified leakage determination reference displacement, determining that the leakage of oil occurs in a rear-wheel-side hydraulic passage if a rear-wheel-side formed pressure is less than a specified leakage determination reference pressure defined as a reference pressure when controlling a rear-wheel-side wheel cylinder, which is pressure at the time of transition+pressure corresponding to piston displacement, and a rear-wheel side difference in pressure defined as required pressure for rear-wheel-side wheel cylinder control−pressure in the rear-wheel-side hydraulic passage, is equal to or greater than a predetermined reference pressure difference.

17. The method according to claim 16, further comprising, when the displacement of the master piston reaches the leakage determination reference displacement, determining that the leakage of oil occurs in the front-wheel-side hydraulic passage if the rear-wheel-side formed pressure is equal to or greater than the specified leakage determination reference pressure and the rear-wheel side difference in pressure is less than the predetermined reference pressure difference.

18. The method according to claim 16, wherein, in order to realize a deceleration as in a normal state in which front and rear wheels are controllable together when there is no leakage by braking only the rear wheel during the two-stage single-acting control, compensating for the required pressure to generate a required pressure greater than the reference pressure, based on a predetermined equation, and the required pressure greater than the reference pressure is generated based on 4-wheel braking force/rear wheel braking force*required pressure in normal state.

19. The method according to claim 13, further comprising, when the leakage of oil is detected during a single-stage control without a pressure sensor for detecting a pressure of a rear-wheel-side hydraulic passage:
shutting off a second hydraulic control valve for regulating a hydraulic pressure in a front-wheel-side hydraulic passage and a sixth hydraulic control valve as a split shut-off valve and switching to a two-stage single-acting control for a rear wheel;
for the two-stage single-acting control for the rear wheel, controlling a motor of the master cylinder unit to make a piston displacement corresponding to a predetermined required pressure and continuing to monitor a current of the motor; and when the displacement of the master piston reaches a specified displacement, determining that the leakage of oil occurs in the rear-wheel-side hydraulic passage if a difference in motor current, defined as an expected current corresponding to the piston displacement–a measured motor current, is greater than a predetermined reference current difference.

20. The method according to claim 19, further comprising, when the displacement of the master piston reaches the specified displacement, determining that the leakage of oil occurs in the front-wheel-side hydraulic passage if the difference in motor current is less than or equal to the predetermined reference current difference.

* * * * *